US012273701B2

(12) United States Patent
Tsingos et al.

(10) Patent No.: US 12,273,701 B2
(45) Date of Patent: Apr. 8, 2025

(54) METHOD, SYSTEMS AND APPARATUS FOR HYBRID NEAR/FAR VIRTUALIZATION FOR ENHANCED CONSUMER SURROUND SOUND

(71) Applicant: Dolby Laboratories Licensing Corporation, San Francisco, CA (US)

(72) Inventors: Nicolas R. Tsingos, San Francisco, CA (US); Satej Suresh Pankey, Sunnyvale, CA (US); Vimal Puthanveed, Tracy, CA (US); Poppy Anne Carrie Crum, Oakland, CA (US); Jeffrey Ross Baker, Thousand Oaks, CA (US); Ian Eric Esten, San Francisco, CA (US); Scott Daly, Kalama, WA (US); Daniel Paul Darcy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 178 days.

(21) Appl. No.: 17/763,124

(22) PCT Filed: Sep. 22, 2020

(86) PCT No.: PCT/US2020/052065

§ 371 (c)(1),
(2) Date: Mar. 23, 2022

(87) PCT Pub. No.: WO2021/061680

PCT Pub. Date: Apr. 1, 2021

(65) Prior Publication Data

US 2022/0345845 A1 Oct. 27, 2022

Related U.S. Application Data

(60) Provisional application No. 63/077,517, filed on Sep. 11, 2020, provisional application No. 62/904,027,
(Continued)

(51) Int. Cl.
*H04R 5/00* (2006.01)
*H04S 7/00* (2006.01)

(52) U.S. Cl.
CPC .......... *H04S 7/304* (2013.01); *H04S 2420/01* (2013.01)

(58) Field of Classification Search
CPC .. H04S 7/304; H04S 2420/01; H04S 2400/11; H04S 3/008; H04S 7/30;
(Continued)

(56) References Cited

U.S. PATENT DOCUMENTS 5,668,884 A 9/1997 Clair, Jr.
5,917,916 A 6/1999 Sibbald
(Continued)

FOREIGN PATENT DOCUMENTS

EP 2806658 B1 9/2017
EP 2809088 B1 12/2017
(Continued)

OTHER PUBLICATIONS

118th MPEG Hobart Meeting Report in Australia, Apr. 3-7, 2017 University of London.
(Continued)

*Primary Examiner* — Carolyn R Edwards
*Assistant Examiner* — Friedrich Fahnert

(57) ABSTRACT

Embodiments are disclosed for hybrid near/far-field speaker virtualization. In an embodiment, a method comprises: receiving a source signal including channel-based audio or audio objects; generating near-field gain(s) and far-field gain(s) based on the source signal and a blending mode; generating a far-field signal based, at least in part, on the source signal and the far-field gain(s); rendering, using a speaker virtualizer, the far-field signal for playback of far-field acoustic audio through far-field speakers into an audio
(Continued)

reproduction environment; generating a near-field signal based at least in part on the source signal and the near-field gain(s); prior to providing the far-field signal to the far-field speakers, sending the near-field signal to a near-field playback device or an intermediate device coupled to the near-field playback device; providing the far-field signal to the far-field speakers; and providing the near-field signal to the near-field speakers to synchronously overlay the far-field acoustic audio.

25 Claims, 8 Drawing Sheets

Related U.S. Application Data filed on Sep. 23, 2019, provisional application No. 62/903,975, filed on Sep. 23, 2019.

(58) Field of Classification Search
CPC ...... H04R 2227/009; H04R 5/04; H04R 3/12; H04R 2400/11; H04R 2420/01
USPC .......................................................... 381/303
See application file for complete search history.

(56) References Cited

U.S. PATENT DOCUMENTS

| | | | |
|---|---|---|---|
| 8,643,779 B2 | 2/2014 | Suess | |
| 8,831,255 B2 | 9/2014 | Crawford | |
| 8,977,974 B2 | 3/2015 | Kraut | |
| 9,094,771 B2 | 7/2015 | Tsingos | |
| 9,107,023 B2 | 8/2015 | Ninan | |
| 9,551,161 B2 | 1/2017 | Oehl | |
| 9,755,847 B2 | 9/2017 | Clavel | |
| 9,774,941 B2 | 9/2017 | Grinker | |
| 9,825,598 B2 | 11/2017 | Kraft | |
| 9,838,829 B2 | 12/2017 | El-Hoiydi | |
| 9,841,942 B2 | 12/2017 | Tull | |
| 9,886,954 B1 | 2/2018 | Meacham | |
| 9,942,675 B2 | 4/2018 | Tull | |
| 10,111,014 B2 | 10/2018 | Schnell | |
| 10,200,779 B2 | 2/2019 | Lesaffre | |
| 2006/0050908 A1 | 3/2006 | Shteyn | |
| 2008/0037804 A1* | 2/2008 | Shmunk | H04S 7/301 381/59 |
| 2008/0118078 A1 | 5/2008 | Asada | |
| 2009/0298420 A1 | 12/2009 | Haartsen | |
| 2012/0095749 A1 | 4/2012 | Capretta | |
| 2012/0213391 A1 | 8/2012 | Usami | |
| 2012/0237037 A1* | 9/2012 | Ninan | H04S 7/304 381/17 |
| 2015/0319518 A1 | 11/2015 | Wilson | |
| 2015/0350804 A1 | 12/2015 | Crockett et al. | |
| 2016/0330556 A1 | 11/2016 | Defnet | |
| 2017/0156006 A1 | 6/2017 | Dennis | |
| 2017/0195817 A1 | 7/2017 | Yen | |
| 2017/0366913 A1* | 12/2017 | Stein | G10L 19/008 |
| 2018/0035234 A1* | 2/2018 | Roach | G02B 27/017 |
| 2018/0109895 A1* | 4/2018 | Audfray | H04S 7/302 |
| 2018/0367937 A1 | 12/2018 | Asada | |
| 2019/0019495 A1 | 1/2019 | Asada | |
| 2019/0116445 A1 | 4/2019 | Gerrard et al. | |
| 2019/0215637 A1 | 7/2019 | Lee | |
| 2019/0246209 A1* | 8/2019 | Audfray | H04S 7/304 |

FOREIGN PATENT DOCUMENTS

| | | |
|---|---|---|
| EP | 3474576 A1 | 4/2019 |
| JP | 2015039092 A | 2/2015 |
| JP | 2015530825 A | 10/2015 |
| JP | 2019523607 A | 8/2019 |
| JP | 2019523913 A | 8/2019 |
| WO | 2011135283 A2 | 11/2011 |
| WO | 2012042905 A1 | 4/2012 |
| WO | 2012145176 A1 | 10/2012 |
| WO | 2016183379 | 11/2016 |
| WO | 2016183379 A2 | 11/2016 |
| WO | 2018045112 A1 | 3/2018 |
| WO | 2019103584 A1 | 5/2019 |

OTHER PUBLICATIONS

De Vries, D. et al."Auralization of Sound Fields by Wave Field Synthesis" presented at the 106th Convention, May 8-11, 1999, Munich, Germany, AES Monograph, 1999.

Ellis, K. et al."Audio Description and Australian Television" Feb. 2018, pp. 1-58.

Kehe, J. "The Real Reason you Used Closed Captions for Everything Now" Jun. 26, 2018 https://onezero.medium.com/why-gen-z-loves-closed-captioning-ec4e44b8d02f.

Kondo, K. et al."Characteristics Comparison of Two Audio Output Devices for Augmented Audio Reality" IEEE Explore, Jan. 6, 2014, Asia-Pacific Signal and Information Processing Association, pp. 1-6.

Lentz, T. et al "Precise Near-to-Head Accoustics with Binaural Synthesis", Journal of Virtual Reality and Broadcasting, vol. 3, 2006, No. 2, pp. 1-12.

Menzies, Dylan "Nearfield Synthesis of Complex Sources with High-Order Ambisonics, and Binaural Rendering" Proc. of the 13th International Conference on Auditory Display, Montreal, Canada, Jun. 26-29, 2007, pp. 1-8.

Pulkki, Ville "Compensating Displacement of Amplitude-Panned Virtual Sources" Compensating Virtual Source Displacement, AES 22nd International Conference on Virtual, Synthetic and Entertainment Audio, Section 2, pp. 3-4, Jun. 1, 2002.

Rui, Y. et al "Calculation of Individualized Near-Field Head-Related Transfer Function Database Using Boundary Element Method", Audio Engineering Society Convention Paper 8901, May 4-7, 2013, Rome, Italy, pp. 1-8.

Six, J. et al "Synchronizing Multimodal Recordings using Audio-to-Audio Alignment" Journal on Multimodal User Interfaces, Sep. 30, 2015.

Ulanoff, Lance "Why GenZ Loves Closed Captioning" Jan. 17, 2019 https://onezero.medium.com/why-gen-z-loves-closed-captioning-ec4e44b8d02f.

Yu, G. et al "Perceptual Evaluation on the influence of individualized near-field head-related transfer functions on auditory distance localization", The Journal of the Acoustical Society of America, vol. 141, Issue 5, Jun. 2017.

* cited by examiner

METHOD, SYSTEMS AND APPARATUS FOR HYBRID NEAR/FAR VIRTUALIZATION FOR ENHANCED CONSUMER SURROUND SOUND

CROSS-REFERENCE TO RELATED APPLICATIONS

This application claims priority to U.S. Provisional Application No. 62/903,975, filed 23 Sep. 2019; U.S. Provisional Application No. 62/904,027, filed 23 Sep. 2019; and U.S. Provisional Application No. 63/077,517, filed 11 Sep. 2020, each of which is incorporated herein by reference in its entirety.

TECHNICAL FIELD

This disclosure relates generally to audio signal processing.

BACKGROUND

Typical cinema soundtracks comprise many different sound elements corresponding to on-screen, off-screen, unseen and implied elements and images, dialog, noises and sound effects that emanate from different on-screen elements and combine with background music and ambient effects to create the overall audience experience. The artistic intent of the creators and producers represents their desire to have these sounds reproduced in a way that corresponds as closely as possible to what is shown on screen with respect to sound source position, intensity, movement and other similar parameters.

Traditional channel-based audio systems send audio content in the form of speaker feeds to individual speakers in a playback environment, such as stereo and 5.1 systems. To further improve the listener experience, some home theatre systems employ object-based audio to provide a three-dimensional (3D) spatial presentation of sound utilizing audio objects, which are audio signals with associated parametric source descriptions of apparent source position (e.g., 3D coordinates), apparent source width and other parameters.

Home theatre systems often include fewer speakers than cinemas, and are thus less capable of reproducing 3D sounds in accordance with the artistic intent of the creators. Indeed, a shortcoming in all listening environments is that they are the periphery of the listening environment, and therefore possess limited ability to create a profound sense of nearness or farness from the listener. Speaker virtualization algorithms are often employed in home theatre systems to reproduce sounds at various locations in the playback environment where no physical speakers exist. Some 3D sounds, however, cannot be reproduced using only stereo speakers, or even 5.1 surround systems, which are the most common speaker layouts found in home theatre systems.

SUMMARY

Embodiments are disclosed for hybrid near/far-field speaker virtualization. In an embodiment, a method comprises: receiving, using a media source device, a source signal including at least one of channel-based audio or audio objects; generating, using the media source device, one or more near-field gains and one or more far-field gains based on the source signal and a blending mode; generating, using the media source device, a far-field signal based, at least in part, on the source signal and the one or more far-field gains; rendering, using a speaker virtualizer, the far-field signal for playback of far-field acoustic audio through far-field speakers into an audio reproduction environment; generating, using the media source device, a near-field signal based at least in part on the source signal and the one or more near-field gains; prior to providing the far-field signal to the far-field speakers, sending the near-field signal to a near-field playback device or an intermediate device coupled to the near-field playback device; and providing the far-field signal to the far-field speakers.

In an embodiment, the method further comprises: filtering the source signal into a low-frequency signal and a high-frequency signal; generating a set of two near-field gains, including a near-field low-frequency gain and a near-field high-frequency gain; generating a set of two far-field gains, including a far-field low-frequency gain and a far-field high-frequency gain; generating the near-field signal based on a weighted, linear combination of the low-frequency signal and the high-frequency signal, where the low-frequency signal is weighted by the near-field low-frequency gain, and the high-frequency signal is weighted by the near-field high-frequency gain; and generating the far-field signal based on a weighted, linear combination of the low-frequency signal and the high-frequency signal, where the low-frequency signal is weighted by the far-field low-frequency gain, and the high-frequency signal is weighted by the far-field high-frequency gain.

In an embodiment, the blending mode is based, at least in part, on a layout of the far-field speakers in the audio reproduction environment and one or more characteristics of the far-field speakers or near-field speakers coupled to the near-field playback device.

In an embodiment, the blending mode is surround sound rendering, and the method further comprises: setting the one or more near-field gains and the one or more far-field gains to include all surround channel-based audio or surround audio objects in the near-field signal and all frontal channel-based audio or frontal audio objects in the far-field signal.

In an embodiment, the method further comprises: determining, based on the near-field and the far-field speaker characteristics, that the far-field speakers are more capable of reproducing low frequencies than the near-field speakers; and setting the one or more near-field gains and the one or more far-field gains to include all of the low-frequency channel-based audio or low-frequency audio objects in the far-field signal.

In an embodiment, the method further comprises: determining that the source signal includes distance effects; and setting the one or more near-field gains and the one or more far-field gains to be a function of a normalized distance between the far-field speakers and a specified location in the audio reproduction environment.

In an embodiment, the method further comprises: determining that the source signal includes channel-based audio or audio objects for enhancing a particular type of audio content in the source signal; and setting the one or more near-field gains and the one or more far-field gains to include into the near-field signal the channel-based audio or audio objects for enhancing the particular type of audio content.

In an embodiment, the particular type of audio content is dialog content.

In an embodiment, the source signal is received with metadata including the one or more near-field gains and the one or more far-field gains.

In an embodiment, the metadata includes data indicating that the source signal can be used for hybrid speaker virtualization using the far-field and the near-field speakers.

In an embodiment, the near-field signal, or the rendered near-field signal, and the rendered far-field signal include inaudible marker signals for assisting in the synchronous overlay of the near-field acoustic audio with the far-field acoustic audio.

In an embodiment, the method further comprises: obtaining head pose information of a user in the audio reproduction environment; and rendering the near-field signal using the head pose information.

In an embodiment, equalization is applied to the rendered near-field signal to compensate a frequency response of the near-field speakers.

In an embodiment, the near-field signal or the rendered near-field signal is provided to the near-field playback device over a wireless channel.

In an embodiment, providing the near-field signal or the rendered near-field signal to the near-field playback device further comprises: sending, using the media source device, the near-field signal or rendered near-field signal to an intermediate device that is coupled to the near-field playback device.

In an embodiment, equalization is applied to the rendered far-field signal to compensate for a frequency response of the near-field speakers.

In an embodiment, timestamps associated with the near-field signal or rendered near-field signal are provided by the media source device to the near-field playback device or an intermediate device for assisting in synchronous overlay of the near-field acoustic audio with the far-field acoustic audio.

In an embodiment, generating the far-field signal and the near-field signal based, at least in part, on the source signal and the one or more far-field gains, further comprises: storing the source signal in a buffer of the media source device; retrieving a first set of frames of the source signal stored at a first location in the buffer, wherein the first location corresponds to a first time; generating, using the media source device, the far-field signal based, at least in part, on the first set of frames and the one or more far-field gains; retrieving a second set of frames of the source signal stored at a second location in the buffer, wherein the second location corresponds to a second time that is earlier than the first time; and generating, using the media source device, the near-field signal based, at least in part, on the second set of frames and the one or more near-field gains.

In an embodiment, a method comprises: receiving a near-field signal transmitted by a media source device in an audio reproduction environment, the near-field signal comprising a weighted, linear combination of low-frequency and high-frequency channel-based audio or audio objects for projection through near-field speakers that are proximal to, or inserted in, ears of a user located in the audio reproduction environment; converting, using one or more processors, the near-field signal into digital near-field data; buffering, using the one or more processors, the digital near-field data; capturing, using one or more microphones, far-field acoustic audio projected by far-field speakers; converting, using the one or more processors, the far-field acoustic audio into digital far-field data; buffering, using the one or more processors, the digital far-field data; determining, using the one or more processors and the buffer contents, a time offset; adding, using the one or more processors, a local time offset set to the time offset to produce a total time offset; and initiating, using the one or more processors, playback of the near-field data through the near-field speakers using the total time offset, such that near-field acoustic data projected by the near-field speakers is synchronously overlaid with the far-field acoustic audio.

In an embodiment, a method comprises: receiving, using a media source device, a source signal including at least one of channel-based audio or audio objects; generating, using the media source device, a far-field signal based, at least in part, on the source signal; rendering, using the media source device, the far-field signal for playback of far-field acoustic audio through far-field speakers into an audio reproduction environment; generating, using the media source device, one or more near-field signals based at least in part on the source signal; prior to providing the far-field signal to the far-field speakers, sending the near-field signal to a near-field playback device or intermediate device coupled to the near-field speakers; and providing the rendered far-field signal to the far-field speakers for projection into the audio reproduction environment.

In an embodiment, the near-field signal includes enhanced dialog.

In an embodiment, there are at least two near-field signals sent to the near-field playback device or the intermediate device, and wherein a first near-field signal is rendered into near-field acoustic audio for playback through near-field speakers of the near-field device, and a second near-field signal is used to assist in synchronizing the far-field acoustic audio with the first near-field signal.

In an embodiment, there are at least two near-field signals sent to the near-field playback device, and a first near-field signal includes dialog content in a first language and the second near-field signal includes dialog content in a second language that is different than the first language.

In an embodiment, the near-field signal and the rendered far-field signal include inaudible marker signals for assisting in the synchronous overlay of the near-field acoustic audio with the far-field acoustic audio.

In an embodiment, the method further comprises: receiving, using a wireless receiver, a near-field signal transmitted by a media source device in an audio reproduction environment; converting, using one or more processors, the near-field signal into digital near-field data; buffering, using the one or more processors, the digital near-field data; capturing, using one or more microphones, far-field acoustic audio projected by far-field speakers; converting, using the one or more processors, the far-field acoustic audio into digital far-field data; buffering, using the one or more processors, the digital far-field data; determining, using the one or more processors and the buffer contents, a time offset; adding, using the one or more processors, a local time offset set to the time offset to produce a total time offset; and initiating, using the one or more processors, playback of the near-field data through the near-field speakers using the total time offset, such that near-field acoustic data projected by the near-field speakers is synchronously overlaid with the far-field acoustic audio.

In an embodiment, the method further comprises: capturing, using one or more microphones of the near-field playback device, a targeted sound from the audio reproduction environment; converting, using the one or more processors, the captured targeted sound to digital data; generating, using the one or more processors, an anti-sound by inverting the digital data using a filter that that approximates an electroacoustic transfer function; and cancelling, using the one or more processors, the targeted sound using the anti-sound.

In an embodiment, the far-field acoustic audio includes a first dialog in a first language which is the targeted sound, and the cancelled first dialog is replaced with a second dialog in a second language that is different than the first language, where the second language dialog is included in a secondary near-field signal.

In an embodiment, the far-field acoustic audio includes a first commentary which is the targeted sound, and the cancelled first commentary is replaced with a second commentary that is different than the first commentary, where the second commentary is included in a secondary near-field signal.

In an embodiment, the far-field acoustic audio is the targeted sound cancelled by the anti-sound to mute the far-field acoustic audio.

In an embodiment, a difference between a cinema rendering and a near-field playback device rendering of one or more audio objects is included in the near-field signal and used to render the near-field acoustic audio so that the one or more audio objects that are included in the cinema rendering, but not the near-field playback device rendering, are excluded from the rendering of the near-field acoustic audio.

In an embodiment, a weighting is applied as a function of object-to-listener distance in the audio reproduction environment, so that one or more particular sounds intended to be heard close to a listener are conveyed solely in the near-field signal, and the near-field signal is used to cancel the same particular one or more sounds in the far-field acoustic audio.

In an embodiment, the near-field signal is modified by a listener's Head-Related-Transfer-Function (HRTF) to provide enhanced spatiality.

In an embodiment, an apparatus comprises: one or more processors; memory storing instructions that when executed by the one or more processors, cause the one or more processors to perform any of the previously described methods.

In an embodiment, a non-transitory, computer-readable storage medium having stored thereon instructions, that when executed by one or more processors, cause the one or more processors to perform any of the previously described methods.

Particular embodiments disclosed herein provide one or more of the following advantages. An audio playback system that includes near-field and far-field speaker virtualization enhances a user's listening experience by adding height, depth or other spatial information that is missing, incomplete or imperceptible when the audio is rendered for playback using only far-field speakers.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

DETAILED DESCRIPTION

Nomenclature and Definitions

Figure 1:
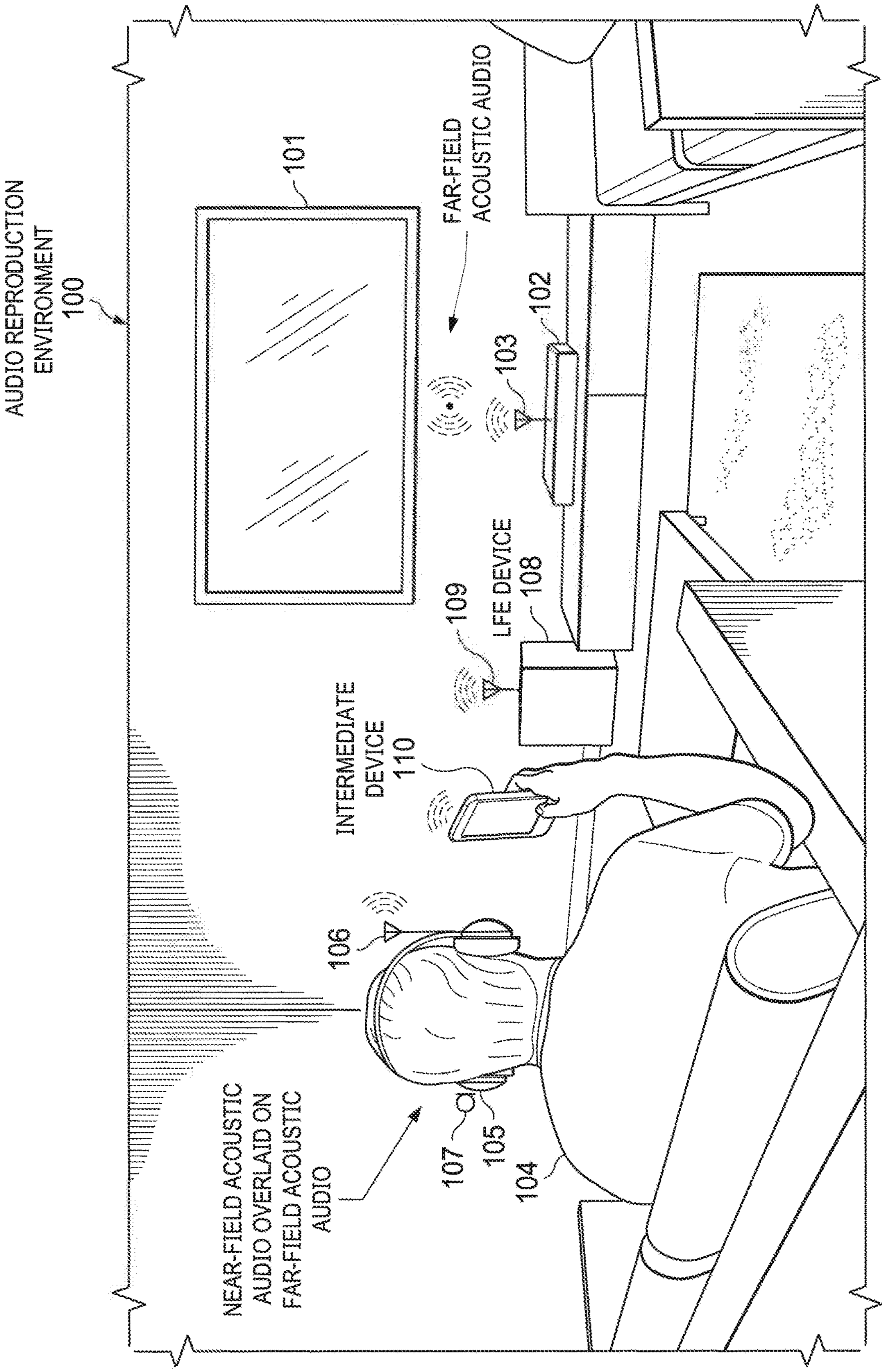
FIG. 1 illustrates an audio reproduction environment that includes hybrid near/far-field speaker virtualization to enhance audio, according to an embodiment.

The following description is directed to certain implementations for the purposes of describing some innovative aspects of this disclosure, as well as examples of contexts in which these innovative aspects may be implemented. The teachings herein, however, can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc.

Accordingly, aspects of the disclosed embodiments may take the form of hardware, a software (including firmware, resident software, microcodes, etc.) and/or a combination of software and hardware. The disclosed embodiments may be referred to herein as a "circuit," "module" or "engine." Some aspects of the disclosed embodiments may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

As used herein, the following terms have the following associated meanings:

The term "channel" means an audio signal plus metadata in which the position is coded as a channel identifier (e.g., left-front or right-top surround).

The term "channel-based audio" is audio formatted for playback through a pre-defined set of speaker zones with associated nominal locations (e.g., 5.1, 7.1, 9.1, etc.).

The term "audio object" or "object-based audio" means one or more audio signals with a parametric source description, such as apparent source position (e.g., 3D coordinates), apparent source width, etc.

The term "audio reproduction environment" means any open, partially enclosed, or fully enclosed area, such as a room that can be used for playback of audio content alone or with video or other content, and can be embodied in a home, cinema, theater, auditorium, studio, game console, and the like.

The term "rendering" means mapping of audio object position data to specific channels.

The term "binaural" rendering is where the Left/Right (L/R) binaural signals are delivered to the L/R ears. Binaural rendering may use a generic or personalized Head-Related Transform Function (HRTF), aspects of an HRTF, such as inter-aural level and time differences, to enhances the sense of spatialization.

The term "media source device" is any device that plays back media content (e.g., audio, video) that is included in a bitstream or stored on a medium (e.g., Ultra-HD or Bluray®, DVD), including but not limited to: television systems, set-top boxes, digital media receivers, surround sound systems, portable computers, tablet computers and the like.

The term "far-field speaker" is any loudspeaker that is wired to, or wirelessly connected to, a media source device, is located at a fixed physical position in an audio reproduction environment, and is not located proximate to, or inserted in, a listener's ears, including but not limited to: stereo speakers, surround speakers, low-frequency enhancement (LFE) devices, sound bars, etc.

The term "near-field speaker" is any loudspeaker that is embedded in, or coupled to, a near-field playback device, and is located proximal to, or inserted in, a listener's ears.

The term "near-field playback device" is any device that includes, or is coupled to, near-field speakers, including but not limited to: headphones, earbuds, headsets, earphones, smart glasses, gaming controllers/devices, augmented reality (AR), virtual reality (VR) headsets, hearing aids, a bone conduction device, or any other means of providing sound proximally to a user's ears. The near-field playback device may be two devices, such as a pair of truly wireless ear buds. Alternatively, the near-field playback device may be a single device for use at two ears, such as a pair of headphones with two ear cups. The near-field playback device may also be designed for use at a single ear only.

In an embodiment, the near-field playback device contains at least one microphone for capturing the sounds near the user, which could include the far-field acoustic audio. There could be one microphone for each ear. The microphone could be one at a central point, such as on headphone band at top of head, or at a central point where wires from each ear converge. There may be multiple microphones, for example one in or near each ear.

In an embodiment, the near-field playback device may contain customary elements for performing signal processing on the microphone and other audio data, including an analog to digital converter (ADC), a central processing unit (CPU), a digital signal processor (DSP), and memory. The near-field playback device may contain customary elements for playback of audio, such as a digital to analog converter (DAC) and an amplifier.

In an embodiment, the near-field playback device contains at least one near-field speaker, and ideally one near-field speaker proximal to each ear. The near-field speakers could comprise a balanced armature, a traditional dynamic driver, or bone conduction transducer.

In an embodiment, the near-field playback device contains a link to the media source system equipment or an intermediate device (e.g., a personal mobile device), for reception of the near-field signal. The link could be a radio frequency (RF) link, such as WiFi, Bluetooth, or Bluetooth low energy (BLE), or the link could be a wire. In an embodiment, a near-field signal is transmitted over the link in a format, many of which are well known, such as an analog signal or as a digitally encoded signal. The digitally encoded signal may be encoded using a codec, such as Opus, AAC, or G.772, for reducing the required data bandwidth.

In an embodiment, the near-field playback device may make microphone measurements of ambient audio that contains far-field acoustic audio (defined below), while also receiving the near-field signal via the link. Using signal processing (discussed below), the near-field playback device may determine a time offset between the far-field acoustic audio and near-field acoustic audio (defined below. The time offset is then used to play near-field acoustic audio out the near-field speakers synchronously overlaid with the far-field acoustic audio projected into the audio reproduction environment by far-field speakers.

The term "intermediate device" is a device that is coupled between a media source device and a near-field playback device, and is configured to process and/or render audio signals received from the media source device, and send the processed/rendered audio signals to the near-field playback device through a wired or wireless connection.

In an embodiment, the intermediate device is a personal mobile device, such as a smart phone, and typically contains a larger battery and higher computational power than could fit into a near-field playback device. The personal device may therefore be convenient to use in conjunction with the near-field playback device, to reduce the power required by the near-field playback device and thereby extend its battery life. To this end, some of the components in the near-field playback device may be preferentially located in the personal mobile device.

For example, if the link between the near-field playback device and the personal mobile device is a wire then the ear device may not require an ADC, CPU or DSP, DAC, or amplifier, since microphone signals and speaker signals may be measured, processed, or generated completely within the personal mobile device and sent along the wire. In this case, the near-field playback device may be similar to headphones with a microphone. In cases where a simple headphone has no microphone it may be possible to measure the far-field acoustic audio with a microphone on the personal mobile device. However, this is not ideal because users often place mobile devices in pockets or bags where the far-field acoustic audio would be muffled.

If the communication link between the near-field playback device and the personal mobile device is wireless, then the near-field playback device may contain components for signal measurement, processing, and generation. Depending on the relative power efficiencies of computation versus communication via the link, it may be more power efficient to retain all signal processing within the ear device, or to continually offload measurements to the personal mobile device for processing. The overall system has the computational capability to perform the signal processing, but this capability may be distributed across components.

In an embodiment, the personal mobile device may receive a near-field signal from entertainment equipment via a relatively highly energy consumptive RF protocol and retransmit it to the near-field playback device over a relatively low-energy protocol. Some examples of high-energy protocols include cellular radio and WiFi. Some examples of relatively low-energy protocols include Bluetooth and Bluetooth Low Energy (BLE). If the near-field playback device is wired headphones, then the personal mobile device may receive the secondary stream from entertainment equipment via a RF protocol and transmit it to the near-field playback device over wires.

In an embodiment, the personal mobile device may provide a screen or controls for a graphical user interface (GUI).

In an embodiment, the personal mobile device may be a charging carry case for a near-field playback device.

The term "source signal" includes a bitstream of audio content or audio and other content (e.g., audio plus video), where the audio content may comprise frames of audio samples and associated metadata, where each audio sample is associated with a channel (e.g., left, right, center, surround) or an audio object. The audio content can include, for example, music, dialog and sound effects.

The term "far-field acoustic audio" means audio that is projected from far-field loudspeakers into an audio reproduction environment.

The term "near-field acoustic audio" means audio that is projected from near-field speakers into a user's ears (e.g., earbuds) or proximal to the user's ears (e.g., headphones).

Overview

The detailed description below is directed to hybrid near/far-field speaker virtualization to enhance audio. In an embodiment, a media source device located in an audio reproduction environment receives a time domain source signal that includes channel-based audio, object-based audio or a combination of channel-based audio and object-based audio. A cross-over filter in the media source device filters the source signal into a low-frequency time domain signal and a high-frequency time domain signal. Near-field signals and far-field signals are generated that are weighted, linear combinations of the low-frequency time domain signal and the high-frequency time domain signal, where the contributions of the low-frequency and high-frequency time domain signals to the near-field and far-field signals are determined by sets of near-field gains and far-field gains, respectively. In an embodiment, the gains are generated by a blending algorithm that takes into account the far-field speaker layout and the characteristics of the far-field speakers and near-field speakers.

The near-field and far-field signals are routed to near-field and far-field audio processing pipelines, respectively, where the signals are rendered into near-field and far-field signals that optionally receive post-processing treatments, such as equalization or compression. In an embodiment, a low-frequency content (e.g., <40 Hz) is filtered by the cross filter and sent directly to an LFE device, bypassing the near-field and far-field signal processing pipelines.

After any post-processing treatments are applied, the rendered far-field signals are feed to far-field speaker feeds, resulting in the projection of far-field acoustic audio into the audio reproduction environment. Prior to the projection of the far-field acoustic audio, and after any post-processing treatments are applied, the rendered near-field signals are fed to a wireless transmitter for wireless transmission to a near-field playback device for playback through near-field speakers. The near-field speakers project near-field acoustic audio that is overlaid and in sync with the far-field acoustic audio.

In an embodiment, the rendered near-field signals are received by the intermediate device over a first wireless communication link (e.g., WiFi or Bluetooth communication link), and further processed before being transmitted to the near-field playback device, over a second wireless communication channel (e.g., a Bluetooth channel). In an embodiment, the near-field signals are rendered by the near-field playback device or by the intermediate device rather than by media source device.

In an embodiment, a total time offset used for synchronization of far-field acoustic audio and near-field acoustic audio is computed at the near-field playback device or the intermediate device. For example, multiple samples of the far-field acoustic audio can be captured by one or more microphones of the near-field playback device or the intermediate device and stored in a first buffer of the near-field playback device or the intermediate device. Likewise, multiple samples of the rendered (or not rendered) near-field signal received over the wireless link can be stored in a second buffer of the near-field playback device or the intermediate device. The first and second buffer contents are then correlated to determine a time offset between the two signals.

In an embodiment, a local time offset is computed that accounts for local signal processing at the near-field playback device and/or intermediate device, and the time required to send audio from the intermediate device over a wireless communication channel to the near-field playback device. The local time offset is added to the time offset resulting from the correlation to determine a total time offset. The total time offset is then used to synchronize the near-field acoustic audio with the far-field acoustic audio for playback of enhanced audio substantially free of artifacts.

Example Audio Reproduction Environment

FIG. 1 illustrates an audio reproduction environment 100 that includes hybrid near/far-field speaker virtualization to enhance audio, according to an embodiment. The audio reproduction environment 100 includes media source device 101, far-field speakers 102, LFE device 108, intermediate device 110 and near-field playback device 105. One or more microphones 107 are attached to, or embedded in, near-field playback device 105 and/or intermediate device 110. Wireless transceiver 106 is shown attached to, or embedded in, near-field playback device 105, and wireless transceivers 103, 109 are shown attached to, or embedded in, far-field speakers 102 (or alternatively media source device 101) and LFE device 108, respectively. A wireless transceiver (not shown) is embedded in intermediate device 110.

It should be understood that audio reproduction environment 100 is only one example environment for hybrid near-far-field speaker virtualization, and that other audio reproduction environments are also applicable to the disclosed embodiments, including but not limited to, environments with more or fewer speakers, different types of speakers or speaker arrays, more or fewer microphones and more or fewer (or different) near-field playback devices or intermediate devices. For example, audio reproduction environment 100 can be a gaming environment with multiple players each with their own near-field playback device.

In FIG. 1, user 104 is watching and listening to media content (e.g., a movie) played through media source device 101 (e.g., a television) and far-field speakers 102 (e.g., a sound bar), respectively. The media content is included in frames of a source signal that include a combination of channels and audio objects. In an embodiment, the source signal can be provided over a wide area network (e.g., the Internet) coupled to a digital media receiver (not shown) through a WiFi connection. The digital media receiver (DMR) is coupled to media source device 101 using, for example an HDMI port and/or optical links. In another embodiment, the source signal can be received through a coaxial cable into a television set-top box and into media source device 101. In yet another embodiment, the source signal is extracted from a broadcast signal received through an antenna or satellite dish. In other embodiments, a media player provides the source signal, which is retrieved from a storage medium (e.g., Ultra-HD, Blu-ray® or DVD discs) and provided to media source device 101.

During playback of the source signal, far-field speakers 102 project far-field acoustic audio into audio reproduction environment 100. Additionally, low-frequency content (e.g., sub bass frequency content) in the source signal is provided to LFE device 108, which in this example is "paired" with far-field speakers 102 using, for example, Bluetooth pairing protocol. Wireless transmitter 103 transmits a radio-frequency (RF) signal with the low-frequency content (e.g., sub bass frequency content) into audio reproduction environment 100 where it is received by wireless receiver 109 that is attached to, or embedded in, LFE, device 108 and projected by LFE device 108 into audio reproduction environment 100.

For certain media content, the example audio reproduction environment 100 described may do a poor job of handling certain types of audio content. For example, certain sound effects may be encoded as ceiling objects that are positioned above user 104 in an allocentric or egocentric frame of reference. Far-field speakers 102, such as the sound bar shown in FIG. 1, may not be able to render these ceiling objects as intended by the content creator. For such content, near-field playback device 105 can be used to playback a binaurally rendered, near-field signal according to the intent of the content creator. For example, for better results a sound effect of a helicopter flying overhead may be rendered for playback on stereo near-field speakers of near-field playback device 105 rather than far-field speakers 102.

There are several problems that arise in audio reproduction environment 100. As described in reference to FIG. 3 below, the aggregate of acoustic propagation time, wireless transmission time and signal processing time can result in the far-field acoustic audio and near-field acoustic audio being out of sync. Solutions to this problem are described in reference to FIGS. 4A and 4B.

Another problem associated with the audio reproduction environment 100 is occlusion of the ears by the near-field speakers due to their construction (e.g., closed-back headphones) or frequency response (e.g., poor low frequency response). Occlusion can be reduced by using low-occlusion ear buds or other open-back headphones. The frequency response of the near-field speakers can be compensated using equalization (EQ). For example, an average or calibrated EQ profile (e.g., an EQ profile that is the inverse or mirror image of the natural frequency response profile of the near-field speakers) can be applied to the rendered near-field speaker input signal before sending the signal to the near-field speaker feeds.

In an embodiment where there is a single user, near-field playback device 105 communicates with media source device 101 through wireless transceivers 103, 106, and provides data indicating the near-field speaker characteristics, such as the frequency response of the near-field speakers and/or audio occlusion data, which is used by an equalizer in media source device 101 to adjust the EQ of the rendered far-field signal. For example, if the audio occlusion data indicates that near-field speakers will attenuate audio data in a particular frequency band (e.g., a high-frequency band) by 3 dB, those frequency bands can be boosted in the rendered far-field signal by approximately 3 dB.

In an embodiment, at least some of rendered near-field speaker input signals are equalized based, at least in part, on an average target equalization based on many instances of the same near-field speaker types to compensate for the non-flatness of the near-field speaker. For example, the rendered near-field signals for a set of headphones may be attenuated by 3 dB for the frequency band in view of the average target equalization, because the average target equalization would result in boosting the rendered far-field signals for that frequency band by 3 dB more than necessary for the audio occlusion caused by the set of headphones. In an embodiment where latency is a factor, the ambient sound of the listening environment is captured using one or more microphones of an intermediate device or headphones, and compensated in the headphones with the inverse of the occlusion.

The end result of the processing described above is that the near-field speakers project near-field acoustic audio that is synchronously overlaid with the far-field acoustic audio projected by far-field speakers 102. Therefore, for certain audio content the near-field speakers can be used to enhance the listening experience of user 104 by adding height, depth or other spatial information that is missing, incomplete or imperceptible when such audio content is rendered for playback using only far-field speakers 102.

Example Signal Processing Pipelines

Figure 2:
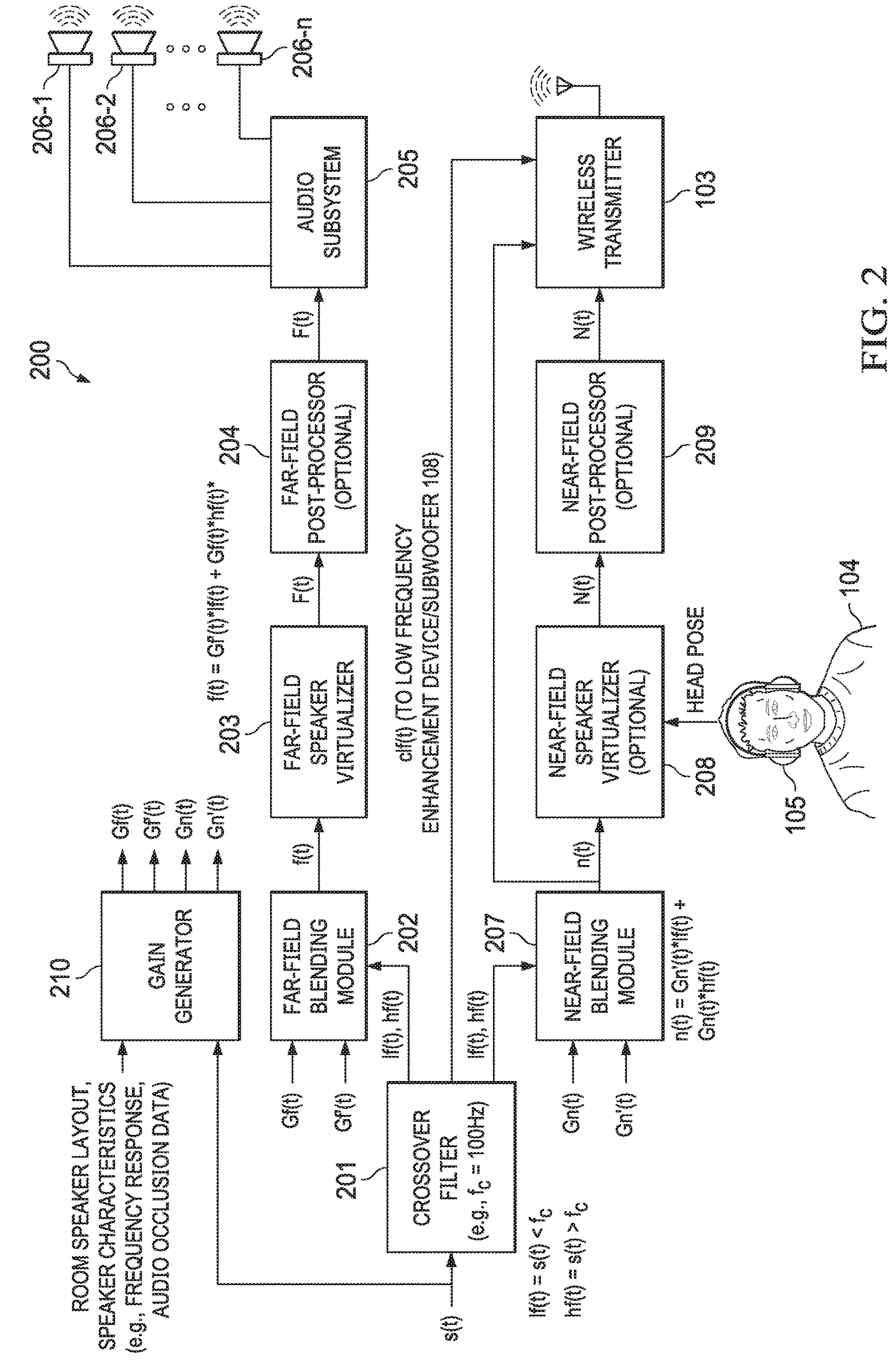
FIG. 2 is a flow diagram of a processing pipeline for hybrid near/far-field speaker virtualization to enhance audio, according to an embodiment.

FIG. 2 is a flow diagram of a processing pipeline 200 for hybrid near/far-field virtualization to enhance audio, according to an embodiment. A source signal, s(t), is input into crossover filter 201 and gain generator 210. The source signal can include channel-based audio, object-based audio or both channel-based and object-based audio. The output of crossover filter 201 (e.g., a high-pass filter) is a low-frequency signal lf(t) and a high-frequency signal hf(t). Crossover filter 201 can implement any desired crossover frequency $f_c$. For example, $f_c$ can be 100 Hz, resulting in the low-frequency signal lf(t) containing frequencies that are less than 100 Hz, and the high-frequency signal hf(t) containing frequencies that are greater than 100 Hz.

In an embodiment, gain generator 210 generates two far-field gains Gf(t), Gf(t) and two near-field gains Gn(t), Gn'(t). The gains Gf(t) and Gn(t) are applied to the high-frequency signal hf(t), and the gains Gf(t) and Gn'(t) are applied to the low-frequency signal lf(t), in far-field and near-field blending modules 202, 207, respectively. Note that the superscript "'" indicates low-frequency.

In an embodiment, the gains may be determined, for example according to the amplitude panning methods described in Section 2, pages 3-4 of V. Pulkki, *Compensating Displacement of Amplitude-Panned Virtual Sources* (Audio Engineering Society (AES) International Conference on Virtual, Synthetic and Entertainment Audio. In some embodiments, other methods may be used for panning far-field audio objects, such as, e.g., methods that involve the synthesis of corresponding acoustic planes or spherical waves, as described in D. de Vries, Wave Field Synthesis (AES Monograph 1999). In some implementations, at least some of the gains may be frequency dependent. Both the near-field and far-field gains may relate to the object or channel position and the far-field speaker layout in audio reproduction environment 100.

In an embodiment, rather than splitting the source signal, s(t) into near-field and far-field signals, the source signal, s(t), includes two channels (L/R stereo channels) that are pre-rendered for playback on near-field playback devices using the methods described above. These "ear" tracks can also be created using a manual process. For example, in a cinema embodiment, objects can be marked as "ear" or "near" during the content authorship process. Because of the way cinema audio is packaged, these tracks are pre-rendered and provided as a part of a digital cinema package (DCP). Other parts of the DCP could include channel-based audio and full Dolby Atmos® channels. In a home entertainment embodiment, two separate pre-rendered "ear" tracks can be provided with the content. The "ear" tracks can be offset in time relative to other audio and video tracks when stored. That way, two reads of the media data from storage are not required to send audio early to the near-field playback device.

Example Blending Modes

In general, Gf(t)=Gf'(t) and Gn(t)=Gn'(t). However, if far-field speakers 206-1 to **206-*n* are more capable of reproducing low frequencies, all of the audio content can be routed to far-field speaker virtualizer 203** by setting Gn'(t)=0 and Gf'(t)=1.

For traditional surround rendering using channel-based audio, where only frontal speakers (e.g., L/R stereo speakers and LFE device are present,) the blending function can route all the surround channels to near-field speaker virtualizer 208 by applying Gn(t)=1.0 and Gf(t)=0.0, and route all the frontal speaker channels (e.g., L/R speaker channels) to far-field speaker virtualizer 203 by applying Gn(t)=0.0 and Gf(t)=1.0.

To render distance effects, both far-field speaker virtualizer 203 and near-field speaker virtualizer 208 are blended as a function of the (normalized) distance, r, to the center of the audio reproduction environment 100 (e.g., the center of a room or the preferred listening location of user 104) as Gn(t)=1.0-r and Gf(t)=sqrt(1.0–Gn(t)*Gn(t)), for r between 0.0 (100% near-field) and 1.0 (100% far-field).

In an embodiment, a percentage of audio content can be played through the far-field speakers and the near-field speakers to provide an enhancement layer (e.g., a dialog enhancement layer), where an audio object or the center channel is rendered with Gf(t)=1.0 and Gn(t)>0.0.

In an embodiment, the output of far-field blending module 202 is far-field signal, f(t), which is a weighted, linear combination of the high-frequency and low-frequency signals hf(t), lft(t), where the weights are the far-field gains, Gf(t), Gf'(t):

$$f(t)=Gf'(t)*lf(t)+Gf(t)*hf(t). \quad [1]$$

The far-field signal, f(t), is input into far-field speaker virtualizer 203, which generates a rendered far-field signal, F(t). The rendered far-field signal, F(t), can be generated using any desired speaker virtualization algorithm that utilizes any number of physical speakers, including but not limited to: vector-based amplitude panning (VBAP) and multiple-direction amplitude panning (MDAP).

The rendered far-field signal, F(t), is input into an optional far-field post-processor 204 for applying any desired post-processing (e.g., equalization, compression) to the rendered far-field signal, F(t). The rendered and optionally post-processed far-field signal, F(t), is then input into audio subsystem 205 coupled to far-field speakers 206-1 to **206-*n*. Audio subsystem 205 includes various electronics (e.g., amplifier, filters) for generating electrical signals for driving far-field speakers 206-1 to 206-*n*. In response to the electrical signals, far-field speakers 206-1 to 206-*n* project far-field acoustic audio into audio reproduction environment 100**. In an embodiment, the far-field processing pipeline described above is fully or partially implemented in software running on a central processing unit and/or digital signal processor.

Referring now to the near-field processing pipeline in FIG. 2, the output of near-field blending module 207 is near-field signal, n(t), which is a weighted, linear combination of the high-frequency and low-frequency signals hf(t), lf(t), where the weights are the near-field gains, Gn(t), Gn'(t):

$$n(t)=Gn'(t)*lf(t)+Gn(t)*hf(t). \quad [2]$$

In an embodiment, the near-field signal, n(t), is input directly into wireless transceiver 103, which encodes and transmits the near-field signal, n(t), to near-field playback device 105 or intermediate device 110 over a wireless communication channel. The near-field signal is delivered to a near-field playback device and becomes a near-field acoustic audio played through near-field speakers that are proximal to the users' ears.

In an embodiment, the near-field signal is an augmentation of some or all the far-field acoustic audio. For example, the near-field signal could contain dialog only, so that the effect of listening to the far-field acoustic audio and the near-field acoustic audio together results in enhanced and more intelligible dialog. Alternately, the near-field signal could provide a mix of dialog and background (e.g., music, effects, etc.), so that the net effect is a personalized, more immersive experience.

In an implementation, the near-field signal contains sounds meant to be perceived close to listeners, as user-proximal sounds in a spatial sound system. In such a system, audio objects, such as for example the sound of a plane flying overhead through a scene, are rendered to a set of speakers in an audio reproduction environment based on audio object coordinates that can change over time, so the audio object sound source appears to move in the audio reproduction environment. However, because sound system speakers are typically at the periphery of rooms or cinemas, they possess limited ability to create a profound sense of nearness or farness from listeners. This is typically solved by panning audio to and through speakers proximal to users' ears.

In an embodiment, the near-field signal could contain sounds meant to be perceived close to listeners for artistic reasons, such as sounds in a film that occur on or around a specific character in a film. Heartbeats, breathing, clothes rustling, footsteps, whispers, etc., that are both close to a character and heard proximal to listeners can engender emotional connection, empathy, or personal identification with that character.

In an embodiment, the near-field signal could contain sounds meant to be played close to listeners to increase the size of the optimal listening location in a room with a spatial audio system. Because the near-field signal is synchronized with the far-field acoustic audio, audio objects panned to or through users' locations are corrected for acoustic travel time from far-field speakers.

In an embodiment, the near-field signal contain sounds used for correcting deficiencies in room acoustics. For example, the near-field signal could be a complete copy of the rendered far-field signal. The far-field acoustic audio is sampled with microphones of a near-field playback device and compared to the near-field signal at the near-field playback device or an intermediate device. If the far-field acoustic audio is found deficient in some sense, for example by missing certain frequency components due the user's location in a room, then those frequency components could be augmented before playback in the near-field speakers.

Aspects of the near-field signal may be customizable by users to suit their own preferences. Some options for customization could include a choice between types of near-field signals, adjustment of loudness equalization in two or more frequency bands, or spatialization of the near-field signal. Types of near-field signals could include dialog only, combinations of dialog, music, and effects, or alternate language tracks.

The near-field signal may be created in a variety of methods. One method is intentional authoring, where one or more possible near-field signals for a specific portion of entertainment content could be authored as part of the media creation process. For example, a clean (i.e., isolated and without other sounds) dialog track could be created. Or, spatial audio objects could be intentionally panned through coordinates that would have them rendered to users' proximal near-field speakers. Or, artistic choices could be made to place certain sounds, such as those originating on or around an identifiable protagonist, close to users.

An alternate method for near-field signal creation is to do so automatically or algorithmically during media content creation. For example, since the center channel in a 5.1 or similar audio mix often contains dialog, and the L and R channels typically contain a main portion of all other sounds, then L+C+R could be used as the near-field signal. Similarly, if a goal of the near-field signal is to provide enhanced dialog, then deep learning or other methods known in the art could be used to extract clean dialog.

The near-field signal could also be automatically or algorithmically created at the time of media playback. In many pieces of entertainment equipment, such as those mentioned previously, internal computation resources such as a central processing unit (CPU) or digital signal processor (DSP) could be used to combine channels or extract dialog for use as the near-field signal. The far-field acoustic audio and near-field signal may contain signals or data inserted for purposes of improving time offset calculation, such as marker signals could be simple ultrasonic tones or could be modulated to carry information or improve detectability, as described in further detail below.

In an alternative embodiment, the near-field signal, n(t), is input into near-field speaker virtualizer 208, which generates a rendered near-field signal, N(t). The rendered near-field signal, N(t), can be generated using a binaural (stereophonic) rendering algorithm that uses, for example, a head-related transform function (HRTF). In an embodiment, near-field speaker virtualizer 208 receives the near-field signal, n(t), and a head pose of user 104, from which it generates and outputs the rendered near-field signal, N(t). The head pose of user 104 may be determined based on a real-time input of a headtracking device (e.g., camera, Bluetooth tracker) that outputs an orientation and possibly head position of user 104 relative to the far-field speakers 206-1 to **206-*n* or audio reproduction environment 100**.

In an embodiment, the rendered near-field signal, N(t), is input into an optional near-field post-processor 209 for applying any desired post-processing (e.g., equalization) to the rendered near-field signal, N(t). For example, equalization can be applied to compensate for deficiencies in the frequency response of the near-field speakers. The rendered or optionally post-processed near-field signal, N(t), is then input into wireless transceiver 103, which encodes and transmits the rendered near-field signal, N(t), to near-field playback device 105 or intermediate device 110 over a wireless communication channel.

As described more fully below, the near-field signal, n(t), or the rendered near-filed signal, N(t), are transmitted earlier than the projection of the far-field acoustic audio to allow for synchronized overlay of the near-field acoustic audio with the far-field acoustic audio. Hereinafter, the examples that follow describe embodiments where a near-field signal, n(t), is transmitted to near-field playback device or intermediate device 110.

In an embodiment, wireless transceiver 103 is a Bluetooth or WiFi transceiver, or uses a custom wireless technology/protocol. In an embodiment, the near-field processing pipeline described above in reference to FIG. 2 can be fully or partially implemented in software running on a central processing unit and/or digital signal processor.

In an embodiment, near-field playback device 105 and/or intermediate device 110 include near-field speaker virtualizer 208 and near-field post-processor 209 rather than media source device 101. In this embodiment, the gains Gn(t), Gf(t) and near-field signal, n(t), are transmitted to the near-field playback device 105 or intermediate device 110 by wireless transceiver 103. Intermediate device 110 then renders the near-field signal, n(t) into rendered near-field signal, N(t), and transmits the rendered signal to near-field playback device 105 (e.g., a headphone, earbuds, or headset, etc.). Near-field playback device 105 then projects near-field acoustic audio proximal or into the ears of user 104 through near-field speakers embedded to, or coupled to, near-field playback device 105.

In an embodiment, the gains Gn(t), Gf(t) are precomputed at a headend or other network-based content service provider or distributer, and transmitted as metadata in one or more layers (e.g., a transport layer) of a bitstream to media source device 101, where the source signal and gains are demultiplexed and decoded and the gains are applied to the audio content of the source signal. This allows the author of the audio content to create different versions of the audio content that can be used with hybrid near/far-field speaker virtualization on a variety speaker layouts in a variety of audio reproduction environments. Additionally, the metadata can include one or more flags (e.g. one or more bits) that indicate to a decoder that the bitstream includes far-field and near-field gains, and thus is suitable for use with hybrid near/far-field speaker virtualization.

In an embodiment, one or both of the near-field and far-field signals can be generated on a network computer and delivered to the media source device, where the far-field signal is optionally further processed before being projected from far-field speakers and the near-field signal is optionally further processed before transmitted to the near-field playback device or intermediate device as previously described.

Early Transmission of Near-Field Signals

Figure 3:
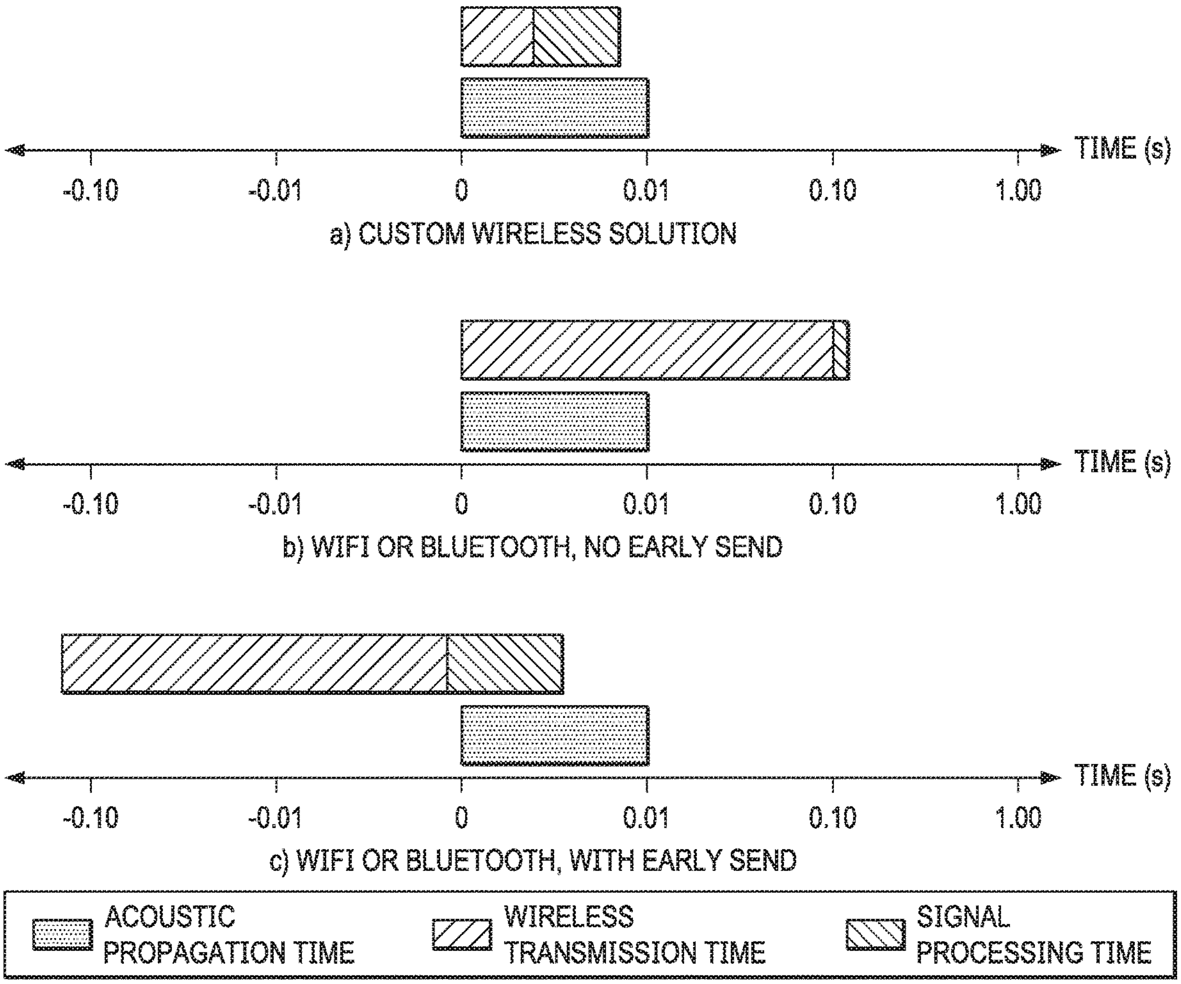
FIG. 3 shows timelines for wireless transmission of near-field signals, including early transmission of near-field signals, according to an embodiment.

FIG. 3 shows example timelines for wireless transmission of near-field signals n(t), illustrating the benefits of early transmission, according to an embodiment. The timeline shows the propagation time of the far-field acoustic audio versus the near-field wireless transmission latency and signal processing time. The far-field acoustic audio begins propagating away from the far-field speakers 206-1 to **206-*n* at t=0 and arrives at the location of user 104 at t=10 ms (assuming about a 3 meter distance from the far-field speakers 206-1 to 206-*n*). Note that the timelines shown in FIG. 3 are non-linear scale, in factors of 10, where negative numbers indicate times earlier than t=0 (e.g., –0.01 is 10 ms before t=0). To enable synchronization, the wireless transmission of the near-field signal, n(t), should be received and decoded, and all synchronization signal processing and rendering completed, before or just as the far-field acoustic audio arrives at microphone 107 of near-field playback device 105 or intermediate device 110**.

Referring to FIG. 3, timeline (a) illustrates how a custom wireless protocol (not commonly used in consumer electronics) can provide short transmission latency and enable the rendered near-field signal to be available in time. Timeline (b) shows that ubiquitous protocols (e.g., WiFi, Bluetooth) do not deliver the near-field signal in time. Timeline (c) shows how the wireless transmission can begin arbitrarily earlier than t=0 seconds to compensate for any transmission latency, and allow for any signal processing time, to enable synchronization of the far-field acoustic audio with the near-field acoustic audio.

The transmission, decoding, and signal processing times required to deliver and synchronize the near-field signal can be significant. Wireless transmission methods commonly used in consumer electronics, such as WiFi and Bluetooth, have latencies ranging from a few tens of milliseconds to a few hundred milliseconds. Further, wireless transmission often encodes audio using a digital codec that compresses the digital information to minimize the required bandwidth. Once received, some signal processing time is required to decode the coded signal and recover the audio signal. The signal processing for synchronization, which will be described in detail below, can require millions of computational operations. Depending on the speed of the processor being used, the decoding and signal processing can also require a long time, especially in battery powered endpoint devices, where computational power may be low.

Sound travels one meter in just under 3 milliseconds. Users in home living rooms or cinemas may be between one and tens of meters from the far-field speakers, so the expected sound travel time ranges from approximately 3 ms to 100 ms. If the near-field signal, n(t), and its subsequent processing requires longer than the travel time of the far-field acoustic audio, then the near-field signal, n(t), arrives too late, and synchronization of the near-field acoustic audio with the far-field acoustic audio is not possible.

In situations where users are much further away from far-field speakers, for example at a large concert venue, it may be possible that the near-field signal, n(t), reaches those users within enough time to allow synchronization. And further, if the wireless protocol is a less ubiquitous or possibly custom-built technology, the wireless transmission latency could be made shorter than the far-field acoustic audio travel time. However, the use of a wireless protocol not already built into most consumer personal mobile devices would necessitate a secondary piece of equipment for wireless reception.

A better solution is to deliver the near-field signal, n(t), using a common wireless protocol, but sufficiently earlier than the far-field acoustic audio is expected to arrive at the near-field playback device 105. For example, if transmitting through a WiFi router causes worse-case latency of 250 ms, decoding and synchronization require 20 ms, and the expected acoustic travel time is 10 ms, then transmission of the near-field signal, n(t), to the near-field playback device 105 (or intermediate device 110) is more than 260 ms before the rendered far-field signal, F(t), is feed to the speaker feeds of far-field speakers 206-1 to **206-*n*, then such early transmission of the near-field signal, n(t), would provide enough time for synchronization at the near-field playback device 105 (or intermediate device 110**). In practice, advance times of 300 ms to 1000 ms are effective.

It is noted that early transmission of the near-field signal, n(t), may not be possible for live events, where stage sounds (vocals, instruments, etc.) propagate outward immediately and then nearly simultaneously through amplifiers and speakers, and where any electronic recording and wireless transmission can only begin after the instant of sound creation. At "live" events, however, some or all sounds could be transmitted wirelessly immediately, then delayed before playing out speakers, such that the wireless transmission has time to be received and used. This could be especially effective for stage sounds that do not immediately propagate acoustically, such as electronic instruments, or when speaker volume is sufficiently loud as to mask any stage sounds. Early transmission is also possible for live events to users who are not present at the live event. For example, viewers of a football game on their home entertainment systems may receive at their homes the entertainment content only after it has been delayed several seconds by network censorship delays, signal processing delays, broadcast and transmission equipment delays, etc. It is usual that such delays easily add up to at least several seconds.

There are several methods of early transmission of the near-field speaker signal, n(t). In an embodiment, the media source device 101 that receives or plays media and delivers the far-field acoustic audio has a buffer containing the source signal. This buffer is read twice: once from a first location in the buffer to deliver the far-field speaker input signal, F(t), and possibly associated video; and at a second time after the first time from a second location in the buffer, by the desired advance time, to deliver the near-field signal, n(t), to the near-field playback device 105 or intermediate device 110. The order of these two buffer reads could be switched; it is only the relative locations in the buffer that matters. In an embodiment, there can be more than one buffer, such as a one buffer for the rendered far-field signal, F(t), and one buffer for the near-field signal, n(t).

In another embodiment, media source device 101 is configured to ingest a source signal that includes audio content and video content. The ingested source signal is buffered to enable a specified delay. The near-field signal, n(t), is transmitted to near-filed playback device 105 where it is projected through near-field speakers as near-field acoustic audio. After the specified delay, audio and video are read from the buffer and the audio is processed as described above to generate far-field acoustic audio.

Discovery Means

In an embodiment, near-field playback device 105 (with optional intermediate device 110) includes hardware or software for understanding when the near-field signal, n(t), is available. This could be as simple as listening for multicast packets on the WiFi network. This could also be accomplished using various methods of zero-configuration networking protocols, such as Apple Bonjour®.

Timestamp Transmission for Synchronization

There are well known methods by which networked devices, wired or wireless, can share information to synchronize their clocks. Two examples are Network Time Protocol (NTP) and IEEE 1588 Precision Time Protocol (PTP). If media source device 101 and near-field playback device 105 (or intermediate device 110) have synchronized their clocks using such a method, then time-stamped audio packets can be played synchronously by each device at agreed upon times.

In a more detailed example, a DMR (e.g., an Apple® TV DMR) and an intermediate device (e.g., a smartphone) have synchronized clocks using NTP. Frames of the near-field signal, n(t), are transmitted using WiFi from the DMR to the intermediate device 500 ms before the same frames are played over a high-definition multimedia interface (HDMI) and/or optical links to the media source device 101 (e.g., a television). The frames of the near-field signal, n(t), each contain a timestamp indicating to the intermediate device 110 the exact time at which the frames should be played into the user's ears. The intermediate device 110 plays the frames of audio at the indicated time, with adjustments made for the time required to transmit the near-field signal, n(t), from intermediate device 110 to near-field playback device 105.

The use of timestamps does not guarantee that the near-field acoustic audio will be synchronously played with the far-field acoustic audio, at least because the timestamps do not automatically account for several sources of time error, namely, the processing time in the media source device 101 for playing the far-field acoustic audio, the wireless signal transmission latency from intermediate device 110 to near-field playback device 105, and the acoustic transmission time of the far-field acoustic audio from far-field speakers 206-1 to **206-*n* to the location of user 104 in audio production environment 100**. Nonetheless, using timestamps would reduce the range of possible delay times that need to be searched, thereby reducing computation time and power consumption. Timestamps could also provide a second-best delay time for synchronization if the acoustic sync fails. In combination with the more rigorous time offset determination described below, timestamps can provide a close estimate, a known good fallback when acoustic sync fails, and a complexity and power consumption reduction.

Time Offset Determination

To avoid negative listening experiences, the near-field acoustic audio is played back synchronously by near-field playback device 105 with the far-field acoustic audio. Small time differences between the near-field acoustic audio and the far-field acoustic audio, on the order of a few milliseconds, can cause noticeable, unpleasant spectral coloration. As the time difference approaches 10-30 ms and beyond, the spectral coloration extends to lower frequencies, then becomes a comb filter. User 104 then hears two copies of the audio content. At lower delays this can sound like a near echo; at higher delays, like a far echo. At even larger time delays, listening to two copies of the audio content causes a very unenjoyable cognitive burden.

To avoid these negative effects, the near-field acoustic audio is overlaid synchronously by near-field playback device 105 with the far-field acoustic audio. In an embodiment, the total time offset between the far-field acoustic audio and the near-field acoustic audio is determined to indicate which segment of the near-field acoustic audio should be sent to the near-field speakers to achieve synchronous overlay. Total time offset determination is achieved using one or more of the methods described in reference to FIG. 4A.

Example Methods of Time Offset Determination

Figure 4A:
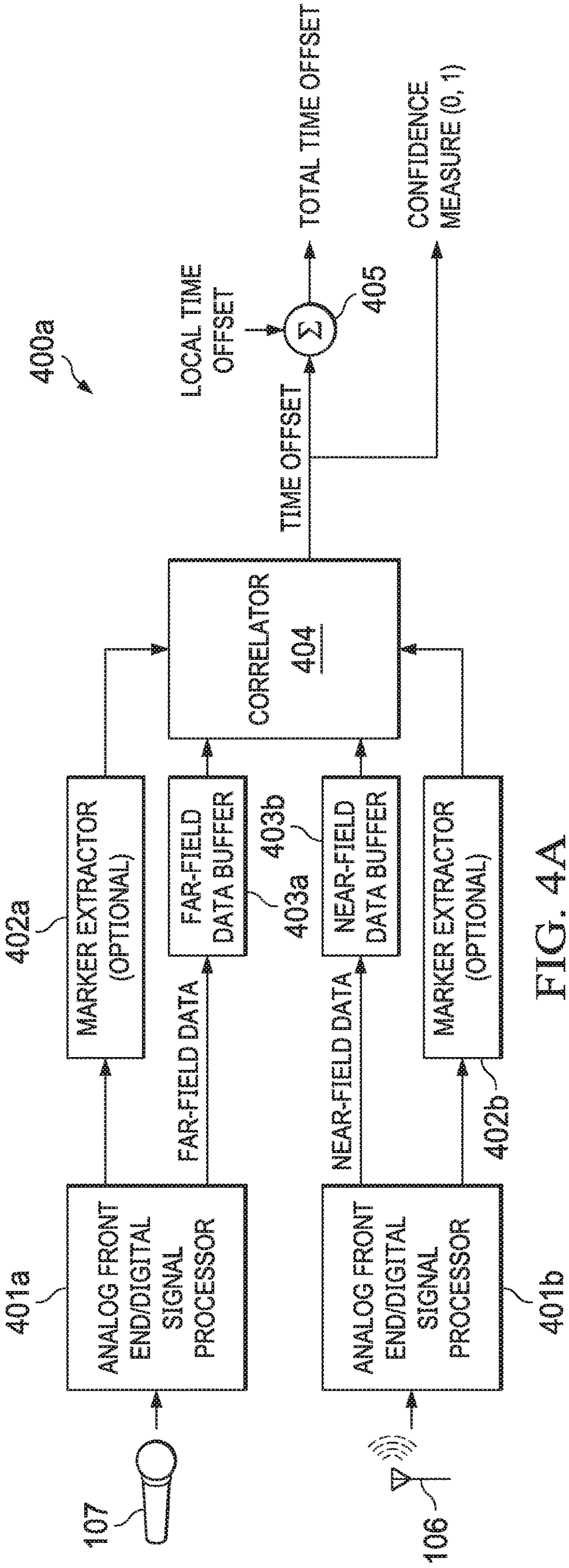
FIG. 4A is a block diagram of a processing pipeline for determining a total time offset to synchronize playback of near-field acoustic audio with far-field acoustic audio, according to an embodiment.

FIG. 4A is a block diagram of processing pipeline **400*a* for determining a total time offset to synchronize playback of near-field acoustic audio with far-field acoustic audio, according to an embodiment. At the near-field playback device 105 (or intermediate device 110), one or more microphones 107 capture samples of the far-field acoustic audio projected by far-field speakers 206-1-206-*n*. The samples are captured and processed by an analog front end (AFE) and digital signal processor (DSP) 401*a* to generate digital far-field data, which is stored in far-field data buffer 403*b*. In an embodiment, the AFE can include a pre-amplifier and analog-to-digital converter (ADC). Prior to receiving the far-field acoustic audio (see FIG. 3), the near-field signal, n(t), is received by wireless transceiver 106 and processed using AFE/DSP 401*b*. AFE/DSP 401*b* includes, for example, circuitry for demodulating/decoding the near-field signal, n(t). The demodulated/decoded near-field signal, n(t), is converted into digital near-field data, which is stored in near-field data buffer 403*b***.

Next, the far-field and near-field data stored in buffers **403*a*, 403*b*, respectively, are compared using a correlation method. In an embodiment, buffers 403*a*, 403*b* store 1 second of data each. The time offset between the contents of buffers 403*a*, 403*b* is determined by correlator 404 which correlates the far-field data stored in buffer 403*a* against the near-field data stored in buffer 403*b*. The correlation could be implemented by correlator 404 using brute force in the time domain or could be performed in the frequency domain after transforming the buffered data into the frequency domain using, for example a Fast Fourier Transform (FFT). In an embodiment, correlator 404** can implement the publicly known generalized cross correlation with phase transform (GCC-PHAT) algorithm in the time domain or frequency domain.

In an embodiment, the near-field signal, n(t), and rendered far-field signal, F(t), include inaudible high frequency marker signals. Such marker signals could be simple ultrasonic tones or could be modulated to carry information or improve detectability. For example, marker signals could be above 18.5 kHz where most humans cannot hear but still within the frequency range passed by most audio equipment. Because such marker signals are common to both the far-field acoustic audio and the near-field signal, they can be used to improve the time offset calculation between the far-field acoustic audio and the near-field signal. In an embodiment, the marker signals are extracted by AFE/DSP **401*a* and AFE/DSP 401*b* using marker signal extractors 402*a*, 402*b*, respectively, so that the marker signals will not be played out the near-field speakers. In embodiment, marker signal extractors 402*a*, 402*b* are low-pass filters that filter out high-frequency inaudible time marker signals which are then provided to correlator 404**.

The output of correlator 404 is a time offset and confidence measures. The time offset is the time between the arrival of the far-field acoustic audio at microphone(s) 107 of near-field playback device 105 or intermediate device 110, and the arrival of the near-field signal, n(t), at the near-field playback device 105. The time offset indicates which part of buffer 403_b_ to play through near-field speakers of near-field playback device 105, and is nearly sufficient for perfect synchronous overlay of the near-field acoustic audio over the far-field acoustic audio.

A total time offset can be determined by adding an additional fixed, local time offset 405 to the time offset output by correlator 404. The local time offset includes the additional time required to send the near-field signal, n(t), from intermediate device 110 to near-field playback device 105, including but not limited to: packet transmission time, propagation delay and processing delay. This local offset time can be accurately measured by intermediate device 110.

In an embodiment, the total time offset determination described above is continuous, rather than occurring once during a startup or a setup step. For example, the total time offset can be computed once per second or a few times per second. This duty cycle allows for synchronization to adapt to changing locations of user 104 within audio reproduction environment 100. Although the computation of total time offset shown in FIG. 4A occurs in near-field playback device 105 or intermediate device 110, in principle the total time offset computation could happen in media source device 101 in particular applications, such as applications that have a single near-field playback device 105.

In an embodiment, correlator 404 also outputs confidence measures, to know when to trust that synchronization has been achieved. One suitable confidence measure is the known Pearson correlation coefficient between buffers 403_a_, 404_b_ shifted by the time offset value, that outputs an indication of linear correlation, where "1" is total positive linear correlation, "0" is no linear correlation and "−1" is total negative linear correlation.

Figure 4B:
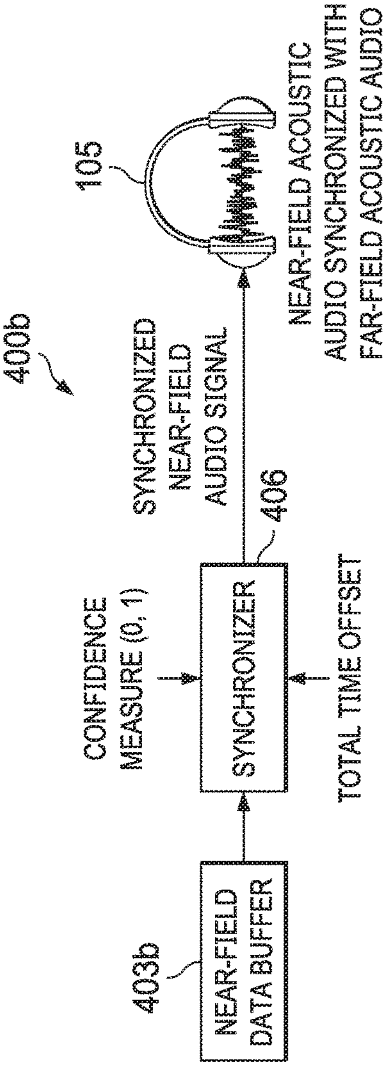
FIG. 4B is a block diagram of a processing pipeline for synchronizing playback of near-field acoustic audio with far-field acoustic audio, according to an embodiment.

FIG. 4B is a block diagram of processing pipeline 400_b_ for synchronizing playback of near-field acoustic audio with far-field acoustic audio, according to an embodiment. In an embodiment, synchronizer 406 receives as input the digital near-field data from buffer 403_b_, and the total time offset and confidence measures output from processing pipeline 403_a_, and applies the total time-offset to the rendered near-field signal to synchronize the near-field acoustic audio playback with the far-field acoustic audio. In an embodiment, the total time offset is only used if its corresponding confidence measure indicates positive linear correlation (i.e., above a positive threshold) between the contents of buffers 403_a_, 403_b_. If the confidence measure indicates no linear correlation (i.e., below a positive threshold), synchronizer 406 does not apply the total time offset to the rendered near-field signal, N(t). Alternatively, a previously determined total time offset can be used.

In an embodiment, synchronizer 406 performs a calculation or operation that provides a pointer into near-field data buffer 403_b_ corresponding to an exact sample in the rendered near-field signal at which to begin playback. Playing the rendered near-field signal may mean retrieving a frame from buffer 403_b_ beginning at the pointer location. The pointer location may also point to a single audio sample. The frame boundaries of audio data retrieved from buffer 403_b_ may or may not be aligned with those used when placing or storing data in buffer 403_b_, so audio can be played starting at any time.

In some operational scenarios, the synchronization algorithm described herein may cause some samples in the buffer to be played more than once or skipped. This may happen when a listener moves closer or further from the far-field speakers. In such cases, blending operations may be performed to make the audio artifacts (e.g., repetition or skipping, etc.) inaudible or less pronounced.

The near-field signal, n(t), and the far-field acoustic audio generated from the rendered far-field signal, F(t), have a time correspondence, such that each contains or provides audio that if synchronized to the other is meant to be heard simultaneously. For example, the far-field acoustic audio may be the full audio of a war movie and contains dialog partly obscured by loud noises. The near-field signal, n(t), or user-proximal sounds generated therefrom, may contain the same dialog but "clean" or unobscured by noises. The time correspondences in this example are the multitude of exactly coincident dialog. Time intervals, such as the exact times between two utterances or other audio events, can have the same length in each signal.

Secondary Near-Field Signals

In an embodiment, the near-field signal may comprise audio signals meant for playback in the ears, and also a secondary near-field signal for additional purposes. One use of a secondary near-field signal is to provide additional information to improve synchronization. If for example the near-field signal ear channels are sparse, then there is not a lot of signal in common to both the near-field signal and far-field acoustic audio. Synchronization is then difficult or infrequent. In that case, the secondary near-field signal provides an additional signal in common with the far-field acoustic audio and synchronization operates on the secondary near-field signal to synchronously overly the far-field acoustic audio on the near-field acoustic audio.

In another embodiment, the secondary near-field signal includes alternate content meant for playback in the ears. This content may not be common with the far-field acoustic audio. For example, the far-field acoustic audio may contain at least English dialog for a film and the secondary near-field signal may contain dialog in an alternate language. The synchronization operates with the far-field acoustic audio and the near-field signal, but the secondary near-field signal is played in the ears. In some implementations, alternate content can include auditory descriptions of scenes and actions for visually impaired users.

Synchronized Stream Cancellation

Early delivery and synchronization present a unique opportunity for active noise cancellation (ANC). Traditional ANC in ear devices relies on microphones to measure target sound that is to be cancelled. There is always the problem of latency and temporal response. The sound reaches the eardrum a very short time after it is measured, and in that time the anti-sound must be calculated and produced. This is often not possible, especially at high frequencies. However, if the target sound is part of the near-field signal or a secondary near-field signal, and also part or the far-field acoustic audio, the target sound may be actively cancelled, i.e. removed from the far-field acoustic audio, without some of the drawbacks of typical ANC. Examples of such target sounds include: dialogue, sounds that are meant to be shared by an entire theater with multiple seating positions, non-dialogue dynamic loud sounds (e.g., music, explosions) causing masking for those with hearing impairments.

ANC microphones are typically outward facing for feedforward cancellation and/or inside an ear cup or ear canal for feedback cancellation. In both feedforward and feedback cancellation, the sound targeted for cancellation is measured by the microphones. An analog to digital converter (ADC) converts the microphone signals to digital data. Then an algorithm inverts that sound, using a filter that approximates the relevant electroacoustic transfer functions to create anti-sound that can destructively interfere with the ambient sound. The filter can be adaptive to work well during changing conditions. The anti-sound is converted back to an analog signal by a digital to analog converter (DAC). An amplifier plays the anti-sound into the ear with a transducer, such as a typical dynamic driver or a balanced armature.

All of the components of this system require time to operate. Each stage, including the microphone, the ADC, the filter, the DAC, the speaker amplifier, may require tens of microseconds or more to operate. The overall latency could be on the order of 100 microseconds or more. This latency detracts greatly from the active noise cancellation by reducing the available phase margin at higher frequencies. A delay of 100 microseconds, for example, is 10% of one period of a 1 kHz sound wave.

If a component of the near-field signal or secondary near-field signal is the sound targeted for cancellation, early delivery of those signals constitutes pre-knowledge of the sound to be cancelled. The output of the noise cancellation filters can be calculated ahead of time, and all other system component delays compensated, so that the operational delays of those filters and system components are irrelevant. This is a different situation than typical noise cancelling, where there is no pre-knowledge of the sound to be cancelled.

In an embodiment, synchronized stream cancellation is used to remove dialog from the far-field acoustic audio, so that it may be replaced with dialog in an alternate language. The active sound cancellation targets the original dialog sent to the ear device in the near-field signal to remove the original dialog from the far-field acoustic audio. An alternate language dialog track, sent via the secondary near-field signal, can be played instead.

In an embodiment, synchronized stream cancellation is used to choose from among possible commentaries in sports content. The far-field acoustic audio contains, for example, the "home" commentary for a football game. An individual viewer of this game can choose to listen instead to the commentary for the "away" team. The "home" commentary in the far-field acoustic audio is delivered to the near-field playback device via the near-field signal and targeted for sound cancellation. The secondary near-field signal delivers the "away" commentary to the individual viewer.

In an embodiment, synchronized stream cancellation is used to substantially mute the entire far-field acoustic audio. For example, a viewer watches entertainment media, and the far-field acoustic audio is played in the room. The near-field signal contains a copy of the far-field acoustic audio and is targeted for sound cancellation. This mode might be useful if the viewer wishes to listen to a nearby person speak.

In an embodiment, synchronized stream cancellation is used to modify spatial audio in a spatial audio entertainment system. In for example a cinema with a surround sound system, some users may have near-field playback devices such as that disclosed herein, and some may not. Users without near-field playback devices can be given a full, normal cinema experience. Accordingly, the rendered far-field signal contains full spatial audio object sounds. The near-field signal contains a user-proximal channel, in which spatial audio objects are panned through the user's near-field playback device. The rendering of the same spatial audio objects to cinema-only system and to the near-field signal may be substantially different, such that users with near-field playback devices have their spatial audio experience diminished by extra room sounds. In an embodiment, the difference between the cinema far-field signal rendering of an audio object and the near-field device rendering of the same audio object can be placed into the secondary near-field signal and targeted for sound cancellation at the near-field playback device or an intermediate device.

In some implementations, a weighting is applied as a function of object-to-listener distance in the audio reproduction environment, so that audio objects intended to be heard close to the listener are conveyed solely in the near-field signal, and the secondary near-field signal cancels the sounds from common audio objects shared by, for example, an entire theater audience. This can allow for placement of sounds extremely close to the listener (or even inside the head) in a manner that could not be done with a shared sound signal.

In another embodiment, synchronized stream cancellation uses a combination of the near-field signal and secondary near-field signal to compensate for non-ideal seating positions in a theater with surround sound (or other 3D sound technology), such as close to any of the boundaries of the acoustic signal space. That is, close to one side of the room, in the back corner, etc. In this way, the listener can receive a perceptual rendering much closer to the intent of the mixing engineer.

In an embodiment, synchronized stream cancellation uses an algorithm, such as for example Least Mean Squares (LMS) adaptive filter algorithm, to construct a filter that matches the microphone signal that includes the captured far-field acoustic audio to the near-field signal. That filter can then be inverted and applied to the near-field signal to create anti-sound. The anti-sound is then played back at the correct instant to cancel the part of the far-field acoustic audio that is common with the near-field signal.

In an alternative embodiment, the algorithm and filter is designed to target all sounds not common to the far-field acoustic audio and near-field signal. In this embodiment, the filter targets all sounds that are not in the near-field signal, so that all sounds except those in the near-field signal are cancelled, and the user hears only the sounds in the near-field signal. For example, if the near-field signal is a copy of the far-field signal, then extraneous room sounds such as conversation or kitchen sounds could be cancelled at the near-field playback device or intermediate device.

In an embodiment, far-field acoustic audio is captured by one or more microphones of the near-field device or an intermediate device and partially rendered in the near-field playback device to compensate for any occlusion of the ear canal by the near-field speakers. If it is desired to enhance the user's experience of the ambient sound, then blocking out all ambient sound in the audio reproduction environment may not be desirable. Some ear buds, for example, partially occlude the ears of most people. The occlusion attenuates and perhaps colors the user's perception of ambient sound in an undesirable way. To correct for this, in an embodiment the effect of occlusion is measured and the missing parts of the ambient sound are added back in to the near-field signal before being rendered for playback through the near-field playback device.

Figure 5:
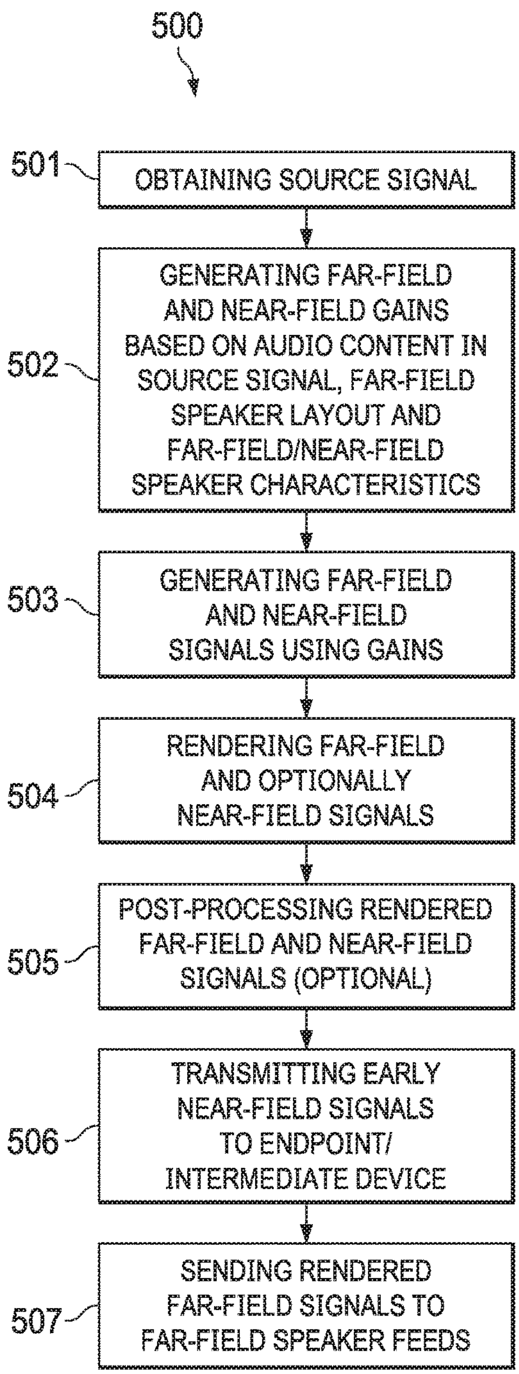
FIG. 5 is a flow diagram of a process of hybrid near/far-field speaker virtualization to enhance audio, according to an embodiment.

FIG. 5 is a flow diagram of process 500 of hybrid near/far-field speaker virtualization to enhance audio, according to an embodiment. Process 500 can be implemented by, for example the media source device architecture described in reference to FIG. 9.

Process 500 begins by obtaining a source signal (501). The source signal can include channel-based audio, object-based audio or a combination of channel-based audio and object-based audio. The source signal can be provided by a media source device, such as a television system, set-top box or DMR. The source signal can be a bitstream received from a network or a storage device (e.g., Ultra-HD, Blu-ray or DVD discs).

Process 500 continues by generating far-field and near-field gains based on the source signal, far-field speaker layout and far-field and near-field speaker characteristics (502). For example, if an audio object in the audio content of the source signal is located over the head of the user, and the media source device is a sound bar, then the gains are computed such that the entire audio object is included in the rendered near-field speaker input signal, so that it can be binaurally rendered by the near-field playback device or intermediate device.

Process 500 continues by generating far-field and near-field signals using the gains (503). For example, the far-field and near-field signals can be weighted, linear combinations of low-frequency and high-frequency signals output by a cross-filter, where the weights are low-frequency and high-frequency gains.

Process 500 continues by rendering the far-field signals, and optionally post-processing the rendered far-field signal (505). For example, any known algorithm can be used to render the far-field signals (e.g., VBAP) and the near-field signals can be binaurally rendered using a HRTF. In an embodiment, the near-field signal is rendered/post-processed at the media source device before being transmitted to the near-field playback device.

Process 500 continues by transmitting early the near-field signal to a near-field playback device or intermediate device (506), and sending the rendered far-field signals to far-field speaker feeds (507). For example, the near-field signal is transmitted to the near-field playback device or intermediate device to provide sufficient time to calculate a total time offset for synchronization with far-field acoustic audio, as described in reference to FIGS. 3, 4A and 4B.

Figure 6:
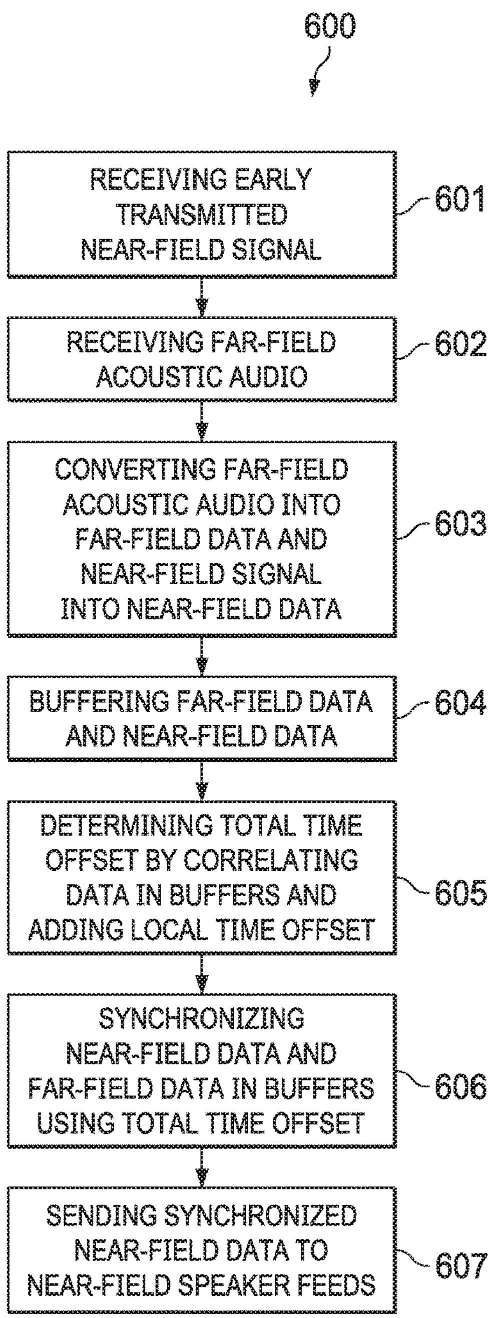
FIG. 6 is a flow diagram of a process of synchronizing playback of near-field acoustic audio with far-field acoustic audio, according to an embodiment.

FIG. 6 is a flow diagram of a process of synchronizing playback of near-field acoustic audio with far-field acoustic audio, according to an embodiment. Process 600 can be implemented by, for example the near-field playback device architecture described in reference to FIG. 10.

Process 600 begins by receiving an early transmitted near-field signal (601). For example, the near-field signal including first channel-based audio and/or audio objects can be received through a wired or wireless channel, as described in reference to FIGS. 1 and 2.

Process 600 continues by receiving far-field acoustic audio (602). For example, a rendered far-field signal including second channel-based audio and/or audio objects is captured by one or more microphones.

Process 600 continues by converting the microphone output into digital far-field data and converting the near-field signal (603) into digital near-field data, and storing the digital far-field data and the digital near-field data in buffers (604), as described in reference to FIG. 4A.

Process 600 continues by determining a total time offset and optional confidence measures by using the buffer contents and adding a local time offset (605), as described in reference to FIG. 4A.

Process 600 continues by initiating playback of the near-field data through the near-field speakers using the total time offset, such that near-field acoustic data projected by the near-field speakers is synchronously overlaid with the far-field acoustic (606). In an embodiment, synchronization is applied based on the confidence measures indicating correlation.

Figure 7:
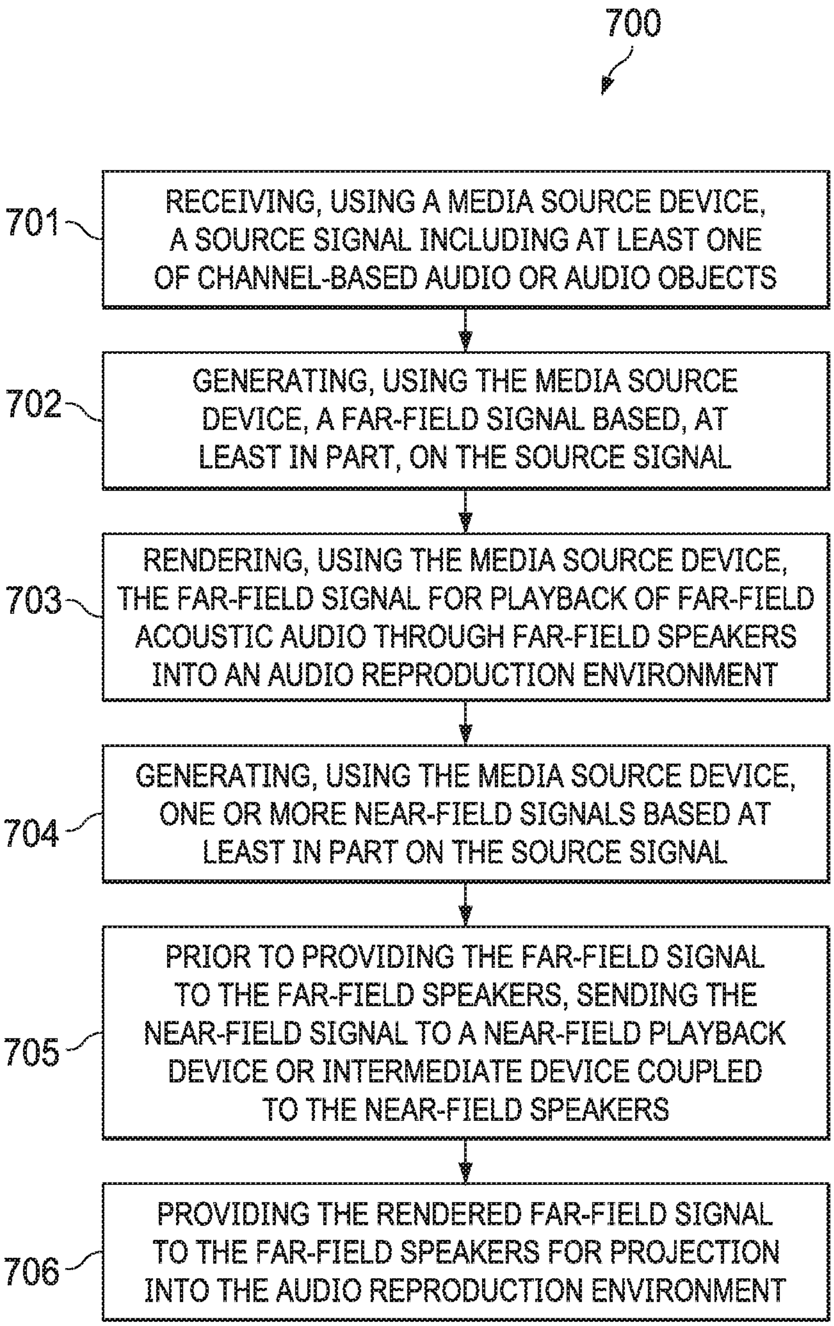
FIG. 7 is a flow diagram of an alternative process of synchronizing playback of near-field acoustic audio with far-field acoustic audio, according to an embodiment.

FIG. 7 is a flow diagram of an alternative process 700 of synchronizing playback of near-field acoustic audio with far-field acoustic audio, according to an embodiment. Process 700 can be implemented by, for example the media source device architecture described in reference to FIG. 9.

Process 700 begins by receiving, using a media source device, a source signal including at least one of channel-based audio or audio objects (701), as described in reference to FIG. 2.

Process 700 continues by generating, using the media source device, a far-field signal based, at least in part, on the source signal, as described in reference to FIG. 2.

Process 700 continues by rendering, using the media source device, the far-field signal for playback of far-field acoustic audio through far-field speakers into an audio reproduction environment (703), as described in reference to FIG. 2.

Process 700 continues by generating, using the media source device, one or more near-field signals based at least in part on the source signal (704), as described in reference to FIG. 2.

Process 700 continues by, prior to providing the far-field signal to the far-field speakers, sending the near-field signal to a near-field playback device or intermediate device coupled to the near-field speakers (705), as described in reference to FIG. 2.

Process 700 continues by providing the rendered far-field signal to the far-field speakers for projection into the audio reproduction environment (706), as described in reference to FIG. 2.

Figure 8:
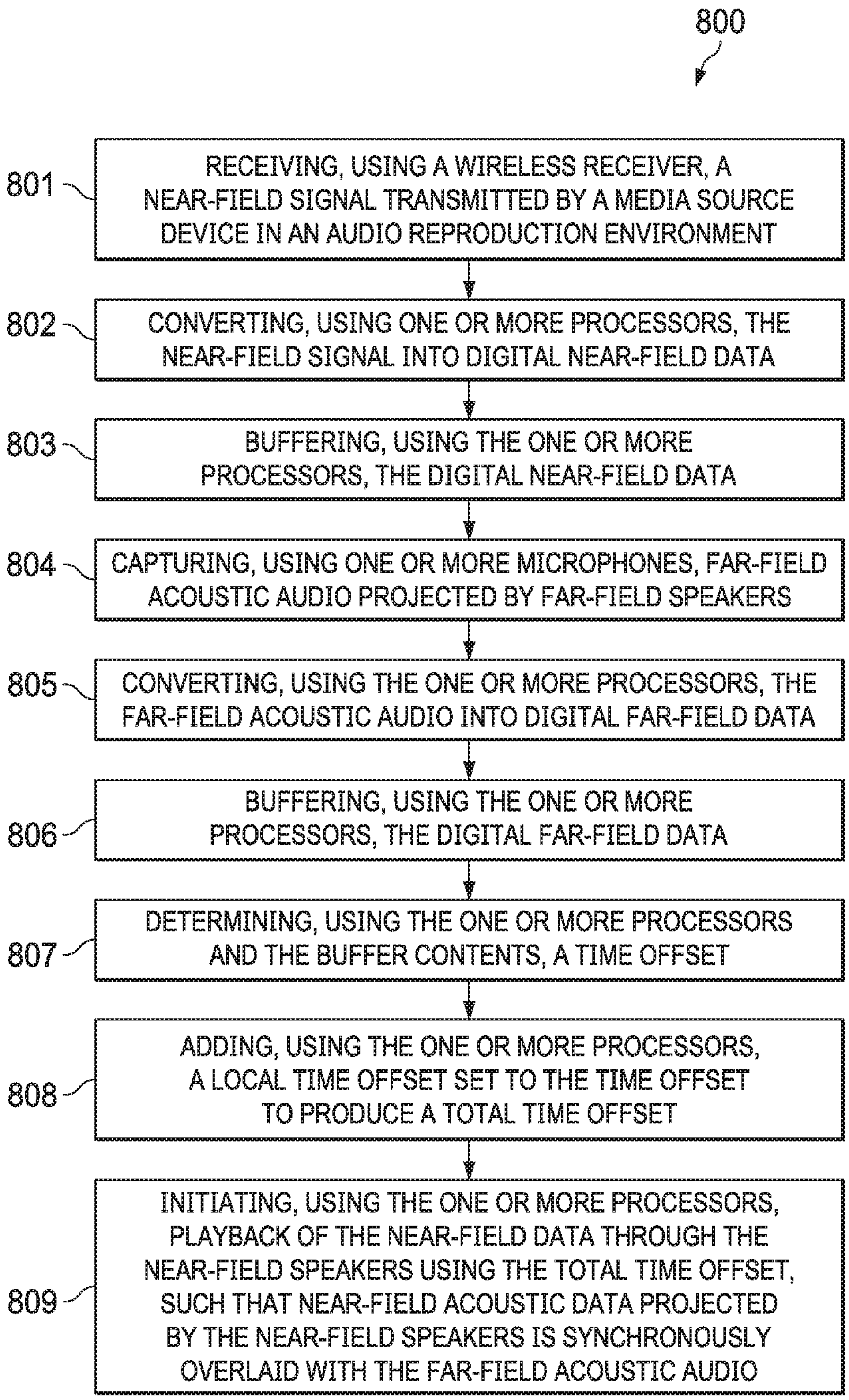
FIG. 8 is a flow diagram of another alternative process of synchronizing playback of near-field acoustic audio with far-field acoustic audio, according to an embodiment.

FIG. 8 is a flow diagram of another alternative process 800 of synchronizing playback of near-field acoustic audio with far-field acoustic audio, according to an embodiment. Process 800 can be implemented by, for example the near-field playback device architecture described in reference to FIG. 10.

Process 800 can begin by receiving, using a wireless receiver, a near-field signal transmitted by a media source device in an audio reproduction environment (801), as described in reference to FIG. 4A.

Process 800 continues by converting, using one or more processors, the near-field signal into digital near-field data (802), as described in reference to FIG. 4A.

Process 800 continues by buffering, using the one or more processors, the digital near-field data (803), as described in reference to FIG. 4A.

Process 800 continues by capturing, using one or more microphones, far-field acoustic audio projected by far-field speakers (804), as described in reference to FIG. 4A.

Process 800 continues by converting, using the one or more processors, the far-field acoustic audio into digital far-field data (805), as described in reference to FIG. 4A.

Process 800 continues by buffering, using the one or more processors, the digital far-field data (806), as described in reference to FIG. 4A.

Process 800 continues by determining, using the one or more processors and the buffer contents, a time offset (807), as described in reference to FIG. 4A.

Process 800 continues by adding, using the one or more processors, a local time offset set to the time offset to produce a total time offset (808), as described in reference to FIG. 4A.

Process 800 continues by initiating, using the one or more processors, playback of the near-field data through the near-field speakers using the total time offset, such that near-field acoustic data projected by the near-field speakers is synchronously overlaid with the far-field acoustic audio (809), as described in reference to FIG. 4B.

Figure 9:
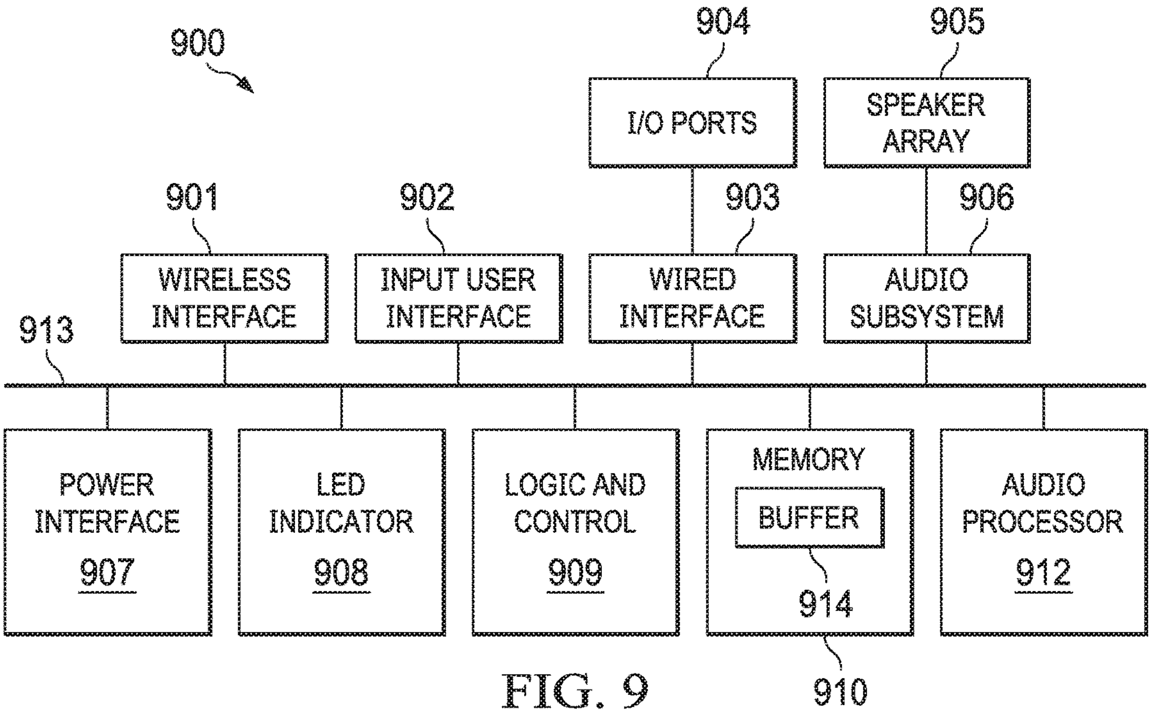
FIG. 9 is a block diagram of a media source device architecture for implementing the features and processes described in reference to FIGS. 1-6, according to an embodiment.

FIG. 9 is a block diagram of a media source device architecture 900 for implementing the features and processes described in reference to FIGS. 1-8, according to an embodiment. Architecture 900 includes wireless interface 901, input user interface 902, wired interface 903, I/O ports 904, speaker array 905, audio subsystem 906, power interface 907, LED indicator 908, logic and control 909, memory 910 and audio processor 912. Each of these components is coupled to one or more buses 913. Memory 910 further includes buffer 914 for use as described in reference to FIG. 2. Architecture 900 can be implemented in a television system, set-top box, DMR, person computer, surround sound system, etc.

Wireless interface 901 includes a wireless transceiver chip or chipset and one or more antennas for receiving wireless communications from a wireless router (e.g., WiFi router), remote, wireless near-field playback device, wireless intermediate device and any other device that desires to communicate with the media source device.

Input user interface 902 includes input mechanisms for allowing a user to control and manage the media source device, such as mechanical buttons, switches and/or a touch interface.

Wires interface 903 includes circuitry for handling communications from various I/O ports 904 (e.g., Bluetooth, WiFi, HDMI, optical), audio subsystem 906 includes an audio amplifier and any other circuitry needed to drive speaker array 905.

Speaker array 905 can include any number, size and type of speakers, whether placed together in a single housing or independent housings.

Power interface 907 includes a power manager and circuitry for regulating power from an AC outlet or a USB port or any other power supplying device.

LED indicator 908 provides the user with visible feedback for the various operations of the device.

Logic and control 909 includes a central processing unit, microcontroller unit or any other circuitry for controlling the various functions of the media source device.

Memory 910 can be any type of memory, such as RAM, ROM and flash memory.

Audio processor 912 can be a DSP that implements a codec and prepares audio content for output through speaker array 905.

Figure 10:
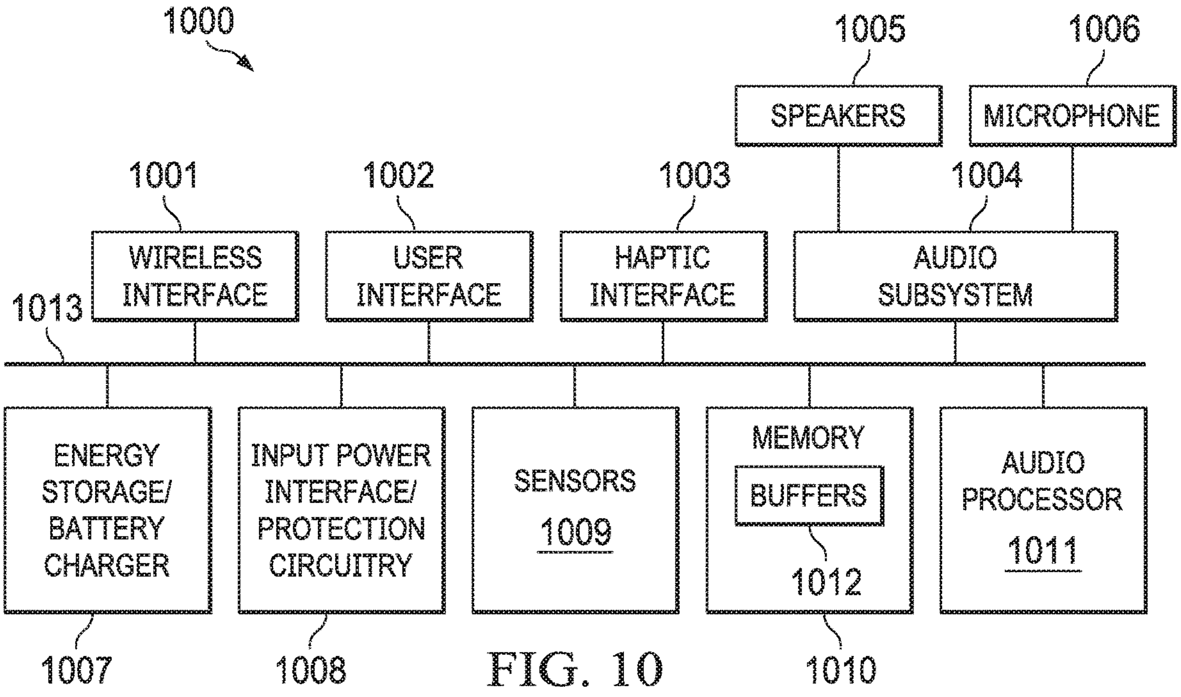
FIG. 10 is a block diagram of a near-field playback device architecture for implementing the features and processes described in reference to FIGS. 1-6, according to an embodiment The same reference symbol used in various drawings indicates like elements.

FIG. 10 is a block diagram of a near-field playback device architecture 1000 for implementing the features and processes described in reference to FIGS. 1-8, according to an embodiment. Architecture 1000 includes wireless interface 1001, user interface 1002, haptic interface 1003, audio subsystem 1004, speakers 1005, microphone 1006, energy storage/battery charger 1007, input power interface/protection circuitry 1008, sensors 1009, memory 1010 and audio processor 1011. Each of these components is coupled to one or more buses 1013. Memory 1010 further includes buffers 1012. Architecture 1000 can be implemented in a headphone, earbud, earphone, headset, gaming hardware, smart glasses, headgear, AR/VR goggles, smart speaker, chair speaker, various automotive interior trim pieces, etc.

Wireless interface 1001 includes a wireless transceiver chip and one or more antennas for receiving/sending wireless communications to/from a media source device and/or an intermediate device and any other device that desires to communicate with the near-field playback device.

Input user interface 1002 includes input mechanisms for allowing a user to control and manage the endpoint device, such as mechanical buttons, switches and/or a touch interface.

Haptic interface 1003 includes a haptic engine for providing force feedback to the user, audio subsystem 1004 includes an audio amplifier and any other circuitry needed to drive speakers 1005.

Speakers 1004 can include stereo speakers, such as found in headphones, earbuds and the like.

Audio subsystem 1004 also includes circuitry (e.g., a preamplifier, ADC, filters) for processing signals from one or more microphones 1006.

Input power interface/protection circuitry 1008 includes circuitry for regulating power from energy storage 1007 (e.g., a rechargeable battery), USB port, charge matt, charging dock or any other power source.

Sensors 1009 can include motion sensors (e.g., an accelerometers, gyros) and biosensors (e.g., a fingerprint detector).

Memory 1010 can be any type of memory, such as RAM, ROM and/or flash memory.

Buffers 1012 (e.g., buffers 403*a*, 403*b* in FIG. 4A) can be created from a portion of memory 1010 and used to store audio data for determining total time offset, as described above in reference to FIG. 4A.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims It is claimed:

1. A method comprising:

receiving, using a media source device, a source signal including at least one of channel-based audio or audio objects;

generating, using the media source device, one or more near-field gains and one or more far-field gains based on the source signal and a blending mode;

generating, using the media source device, a far-field signal based, at least in part, on the source signal and the one or more far-field gains;

rendering, using a speaker virtualizer, the far-field signal for playback of far-field acoustic audio through far-field speakers into an audio reproduction environment;

generating, using the media source device, a near-field signal based at least in part on the source signal and the one or more near-field gains;

prior to providing the far-field signal to the far-field speakers, sending the near-field signal to a near-field playback device or an intermediate device coupled to the near-field playback device; and providing the far-field signal to the far-field speakers.

2. The method of claim 1, further comprising:

filtering the source signal into a low-frequency signal and a high-frequency signal;

generating a set of two near-field gains, including a near-field low-frequency gain and a near-field high-frequency gain;

generating a set of two far-field gains, including a far-field low-frequency gain and a far-field high-frequency gain;

generating the near-field signal based on a weighted, linear combination of the low-frequency signal and the high-frequency signal, where the low-frequency signal is weighted by the near-field low-frequency gain, and the high-frequency signal is weighted by the near-field high-frequency gain; and generating the far-field signal based on a weighted, linear combination of the low-frequency signal and the high-frequency signal, where the low-frequency signal is weighted by the far-field low-frequency gain, and the high-frequency signal is weighted by the far-field high-frequency gain.

3. The method of claim 1, wherein the blending mode is based, at least in part, on a layout of the far-field speakers in the audio reproduction environment and one or more characteristics of the far-field speakers or near-field speakers coupled to the near-field playback device.

4. The method of claim 3, further comprising:

determining, based on the near-field and the far-field speaker characteristics, that the far-field speakers are more capable of reproducing low frequencies than the near-field speakers; and setting the one or more near-field gains and the one or more far-field gains to include all of the low-frequency channel-based audio or low-frequency audio objects in the far-field signal.

5. The method of claim 3, further comprising:

determining that the source signal includes distance effects; and setting the one or more near-field gains and the one or more far-field gains to be a function of a normalized distance between the far-field speakers and a specified location in the audio reproduction environment.

6. The method of claim 1, wherein the near-field signal, or the rendered near-field signal, and the rendered far-field signal include inaudible marker signals for assisting in the synchronous overlay of the near-field acoustic audio with the far-field acoustic audio.

7. The method of claim 1, further comprising:

obtaining head pose information of a user in the audio reproduction environment; and rendering the near-field signal using the head pose information.

8. The method of claim 1, wherein equalization is applied to the rendered near-field signal to compensate a frequency response of the near-field speakers.

9. The method of claim 1, wherein the near-field signal or the rendered near-field signal is provided to the near-field playback device over a wireless channel.

10. The method of claim 1, wherein providing the near-field signal or the rendered near-field signal to the near-field playback device further comprises:

sending, using the media source device, the near-field signal or rendered near-field signal to an intermediate device that is coupled to the near-field playback device.

11. The method of claim 1, wherein equalization is applied to the rendered far-field signal to compensate for a frequency response of the near-field speakers.

12. The method of claim 1, wherein timestamps associated with the near-field signal or rendered near-field signal are provided by the media source device to the near-field playback device or an intermediate device for assisting in synchronous overlay of the near-field acoustic audio with the far-field acoustic audio.

13. A method comprising:

receiving a near-field signal transmitted by a media source device in an audio reproduction environment, the near-field signal comprising a weighted, linear combination of low-frequency and high-frequency channel-based audio or audio objects for projection through near-field speakers that are proximal to, or inserted in, ears of a user located in the audio reproduction environment;

converting, using one or more processors, the near-field signal into digital near-field data;

buffering, using the one or more processors, the digital near-field data;

capturing, using one or more microphones, far-field acoustic audio projected by far-field speakers;

converting, using the one or more processors, the far-field acoustic audio into digital far-field data;

buffering, using the one or more processors, the digital far-field data;

determining, using the one or more processors and the buffer contents, a time offset;

adding, using the one or more processors, a local time offset set to the time offset to produce a total time offset; and initiating, using the one or more processors, playback of the near-field data through the near-field speakers using the total time offset, such that near-field acoustic data projected by the near-field speakers is synchronously overlaid with the far-field acoustic audio.

14. An apparatus comprising:

one or more processors; and memory storing instructions that when executed by the one or more processors, cause the one or more processors to perform the method recited in claim 1.

15. A non-transitory computer-readable storage medium having stored thereon instructions, that when executed by one or more processors, cause the one or more processors to perform the method recited in claim 1.

16. A method comprising:

receiving, using a media source device, a source signal including at least one of channel-based audio or audio objects;

generating, using the media source device, a far-field signal based, at least in part, on the source signal;

rendering, using the media source device, the far-field signal for playback of far-field acoustic audio through far-field speakers into an audio reproduction environment;

generating, using the media source device, one or more near-field signals based at least in part on the source signal;

prior to providing the far-field signal to the far-field speakers, sending the near-field signal to a near-field playback device or intermediate device coupled to the near-field playback device; and providing the rendered far-field signal to the far-field speakers for projection into the audio reproduction environment.

17. The method of claim 16, wherein there are at least two near-field signals sent to the near-field playback device or the intermediate device, and wherein a first near-field signal is rendered into near-field acoustic audio for playback through near-field speakers of the near-field playback device, and a second near-field signal is used to assist in synchronizing the far-field acoustic audio with the first near-field signal.

18. The method of claim 16, wherein the near-field signal and the rendered far-field signal include inaudible marker signals for assisting in the synchronous overlay of the near-field acoustic audio with the far-field acoustic audio.

19. A method comprising:

receiving, using a wireless receiver, a near-field signal transmitted by a media source device in an audio reproduction environment;

converting, using one or more processors, the near-field signal into digital near-field data;

buffering, using the one or more processors, the digital near-field data;

capturing, using one or more microphones, far-field acoustic audio projected by far-field speakers;

converting, using the one or more processors, the far-field acoustic audio into digital far-field data;

buffering, using the one or more processors, the digital far-field data;

determining, using the one or more processors and the buffer contents, a time offset;

adding, using the one or more processors, a local time offset set to the time offset to produce a total time offset; and initiating, using the one or more processors, playback of the near-field data through near-field speakers using the total time offset, such that near-field acoustic data projected by the near-field speakers is synchronously overlaid with the far-field acoustic audio, wherein a weighting is applied as a function of object-to-listener distance in the audio reproduction environment, so that one or more particular sounds intended to be heard close to a listener are conveyed solely in the near-field signal, and the near-field signal is used to cancel the same particular one or more sounds in the far-field acoustic audio.

20. The method of claim 19, further comprising:

capturing, using one or more microphones of the near-field playback device, a targeted sound from the audio reproduction environment;

converting, using the one or more processors, the captured targeted sound to digital data;

generating, using the one or more processors, an anti-sound by inverting the digital data using a filter that that approximates an electroacoustic transfer function; and cancelling, using the one or more processors, the targeted sound using the anti-sound.

21. The method of claim 20, wherein the far-field acoustic audio is the targeted sound cancelled by the anti-sound to mute the far-field acoustic audio.

22. The method of claim 20, wherein a difference between a cinema rendering and a near-field playback device rendering of one or more audio objects is included in the near-field signal and used to render the near-field acoustic audio so that the one or more audio objects that are included in the cinema rendering, but not the near-field playback device rendering, are excluded from the rendering of the near-field acoustic audio.

23. The method of claim 19, wherein the near-field signal is modified by a listener's Head-Related-Transfer-Function (HRTF) to provide enhanced spatiality.

24. An apparatus comprising:

one or more processors; and memory storing instructions that when executed by the one or more processors, cause the one or more processors to perform the method recited in claim 19.

25. A non-transitory computer-readable storage medium having stored thereon instructions, that when executed by one or more processors, cause the one or more processors to perform the method recited in claim 19.

* * * * *